(12) United States Patent
Taoda et al.

(10) Patent No.: US 6,835,359 B2
(45) Date of Patent: Dec. 28, 2004

(54) EMISSION CLEANING INSTALLATION AND CLEANING METHOD FOR EMISSIONS

(75) Inventors: Hiroshi Taoda, Nagoya (JP); Yukio Yamada, Tokyo (JP); Kazuu Aizawa, Koshigaya (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 236 days.

(21) Appl. No.: 10/173,683

(22) Filed: May 29, 2002

(65) Prior Publication Data

US 2002/0189930 A1 Dec. 19, 2002

Related U.S. Application Data

(62) Division of application No. 09/689,441, filed on Oct. 12, 2000, now Pat. No. 6,508,992.

(30) Foreign Application Priority Data

Oct. 13, 1999 (JP) .......................................... 11-290579
Oct. 13, 1999 (JP) .......................................... 11-290582
Dec. 20, 1999 (JP) .......................................... 11-360219
Jul. 24, 2000 (JP) ...................................... 2000-221677

(51) Int. Cl.$^7$ ............................................... B01J 19/08
(52) U.S. Cl. ...................... 422/186.3; 422/121; 588/227
(58) Field of Search .............................. 422/186.3, 121; 588/227

(56) References Cited

U.S. PATENT DOCUMENTS 5,480,524 A * 1/1996 Oeste ........................ 204/158.2
5,866,752 A * 2/1999 Goozner ...................... 588/227
6,080,281 A * 6/2000 Attia ........................ 204/157.3

* cited by examiner

*Primary Examiner*—Kishor Mayekar
(74) *Attorney, Agent, or Firm*—Lorusso Loud & Kelly LLP; Marc A. Vivenzio; Jeffrey D. Washville

(57) ABSTRACT

An emission cleaning installation which is easy to connect continuously even to existing large-scale incineration furnaces and which is able to oxidatively break down and eliminate environmental pollutants contained in the emissions, for example dioxins, dibenzofurans, coplanar PCBs, nitrogen oxides (NOx) and the like without temperature control of the emission temperature, by the photocatalytic action of the photocatalyst, and to a method for emission cleaning and elimination which uses the above-mentioned emission cleaning installation.

15 Claims, 16 Drawing Sheets

EMISSION CLEANING INSTALLATION AND CLEANING METHOD FOR EMISSIONS

CROSS REFERENCE TO RELATED APPLICATIONS

The instant application is a divisional of application Ser. No. 09/689,441 filed Oct. 12, 2000, now U.S. Pat. No. 6,508,992, the contents of which are incorporated by their entirety.

BACKGROUND OF THE INVENTION (1) Field of the Invention

The present invention relates to an emission cleaning installation for cleaning and eliminating emissions, and to an emission cleaning method which uses this emission cleaning installation, and more particular to an emission cleaning installation which can be fitted into existing large-scale incineration furnaces and is able to oxidatively break down environmental pollutants which are contained in the emissions expelled from an incineration furnace and of which dioxins, dibenzofurans, coplanar PCBs, nitrogen oxides (NOx) and the like are representative examples, by the photocatalytic action of a photocatalyst, without control of the emission temperature, and still more particular to an emission cleaning method which uses this emission cleaning installation.

(2) Background of the Related Art

Hitherto, emission cleaning installations which involve cleaning the emissions expelled from incineration furnaces have been proposed as follows:

1. A Cleaning installation whereby the emission supply duct is provided with electrostatic separators or bag filters or cyclones and the like, in order to physically eliminate dioxins from the emissions;
2. A Cleaning installation which is filled with an adsorption agent comprising activated carbons, activated charcoals and the like, in order to eliminate by adsorption environmental pollutants of which the dioxins contained in the emissions are representative;
3. A Device which mixes photocatalysts for breaking down environmental pollutants in the emissions by oxidation, by means of the photocatalytic effect of the photocatalyst with the emissions, and introduces them into an emission decomposition tower, and which recovers the photocatalyst by means of dust separators downstream of the emission decomposition tower after the photocatalyst has been photoexcited by means of ultraviolet light emitted from a low-pressure mercury lamp, thus revealing its photocatalytic effect (patent application JP-H05-285342).

However, the emission cleaning installation which is described in patent application JP-H05-285342 is an installation which mixes the photocatalyst into the emissions, and if a large amount of photocatalysts is mixed into the emissions, the transmission through the emissions deteriorates (because the light is reflected, and consequently the light transmission deteriorates). Although it is possible for exciting light which is radiated from the light source to be radiated to a sufficient extent with respect to the photocatalyst situated relatively close to the light source, and therefore the photocatalyst can be photoexcited, thus revealing the photocatalytic action (=photocatalytic function), the exciting light (which is emitted from the light source) cannot be radiated to a sufficient extent with respect to the photocatalyst situated at a distance from the light source. Therefore, because the photocatalyst cannot be sufficiently photoexcited, the photocatalytic function of these photocatalysts cannot be sufficiently displayed and, overall, it is known that there are problems with the efficiency of the emission cleaning method brought about by the photocatalytic action (=photocatalytic function) of the photocatalyst being reduced considerably.

There were also further problems relating to the cleaning installation overall becoming complicated and therefore more expensive, since the photocatalyst had to be separated back out of the decomposition gas after treatment, for example by means of separators and the like.

On the other hand, there are elimination problems with devices provided with electrostatic separators or bag filters or cyclones and the like and there are also problems with eliminating and recovering dioxins and the like in the emissions using such devices. Specifically, of the dioxins contained in the emissions, although it is possible to eliminate the dioxins contained in fly ash, together with dust materials, the dioxins adhering to very fine fly ash, low-boiling, gaseous dioxins and the like cannot be eliminated.

Furthermore, since the emissions expelled from incineration furnaces are generally at elevated temperatures, a control unit is required if such environmental pollutants are eliminated and recovered, for example by means of separators, in order to provide rapid, considerable cooling of hot emissions by means of cooling devices and the like before they are fed to the separator. This led to problems in terms of the emission cleaning installation overall becoming complicated and more expensive. Moreover, similar problems are encountered with emission cleaning installations which use bag filters or cyclones.

On the other hand, it has been proposed to initiate decomposition processes by oxidation using a metallic catalyst made from titanium, vanadium, platinum and the like as an additional agent. However, since in this decomposition process by oxidation carried out by the metallic catalyst, the effective temperature of the atmosphere is in the region of 230° C., and also the temperature range which will be effective is narrow, it is necessary for the emissions to be quickly and considerably cooled by means of a cooling device or the like before they are fed to the separator or bag filter or the cyclone, yet at the same time it is necessary for the cooled emissions to be heated and for their temperature to rise again; this makes temperature control of the emissions very troublesome and laborious.

Furthermore, in elimination methods carried out by absorption agents comprising the abovementioned activated carbons or activated charcoals, although in theory it is possible for the low-boiling, gaseous dioxins to be eliminated, it is also necessary for the used waste adsorption agent which has absorbed dioxins to be fed for secondary treatment. Additionally, because the emission temperature is in the region of greater than 150° C., dioxins which have been absorbed with great difficulty become separated from the adsorption agent and are then deposited, or because the adsorption capacity of activated carbons falls, and then the desired elimination by adsorption can no longer be achieved, or because the emission temperature generally fluctuates readily and constantly, various problems are always encountered, involving the dioxins which have been adsorbed at high temperature becoming separated and then dispersed in the emissions once again, etc.

SUMMARY OF THE INVENTION

The present invention involves providing an emission cleaning installation by means of which environmental pollutants in the emissions, which have been expelled from the incineration furnace and of which dioxins, dibenzofurans, coplanar PCBs and the like are representative examples, can be broken down by oxidation by the photocatalytic action of the photocatalyst, and by means of which they can be cleaned and treated until they can be discharged to atmosphere.

The invention also involves providing an emission cleaning installation with which emissions which have been expelled from the incineration furnace can be cleaned and treated without temperature control and which, if necessary, are easy to retrofit in existing large-scale incineration furnaces.

The invention furthermore involves providing an emission cleaning installation which is designed in such a way that, in order for the photocatalytic action of the photocatalyst to be displayed to a sufficient extent, the light source is a combination of a disinfecting lamp, which has its maximum wavelength in the vicinity of 254 nm, and a black light lamp, which bas its maximum wavelength in the vicinity of 380 nm, and that the abovementioned light source can radiate sufficient exciting light onto all the photocatalysts. This can be achieved by the fact that the surface of the photocatalyst is excited by ultraviolet light which is radiated from the disinfecting lamp, while the ultraviolet light which is radiated out of the black light lamp is allowed to pass through the photocatalyst and penetrate into the interior of the photocatalyst container.

Furthermore, the invention involves providing an emission cleaning installation which uses photocatalyst pellets which are in the form of porous bodies and are formed by coating the surface of the porous metal body with a titanium oxide coating in the anatase form as its crystalline form, in order to increase the specific surface area of the photocatalyst pellets.

Furthermore, the invention involves providing an emission cleaning installation which uses photocatalyst pellets which are formed by coating the surface of the porous ceramic support with a titanium oxide coating in the anatase form as its crystalline form, in order to increase the specific surface area of the photocatalyst pellets. Examples of porous ceramic supports which may be mentioned are activated carbon, activated alumina, silica gel, porous glass and the like.

The invention furthermore involves providing an emission cleaning installation which uses photocatalyst pellets which are formed by coating one of the surfaces with woven fabric which weaves in heat-resistant fibres, nonwoven fabric, knitted fabrics or any other type of fibrous structure with a titanium oxide coating in the anatase form as its crystalline form.

The invention also involves providing an emission cleaning installation which uses photocatalyst pellets, consisting in the surface of the titanium oxide coating being coated again with a type of metal coating which is selected from groups consisting of platinum, rhodium, ruthenium, palladium, iron, silver, copper and zinc.

Furthermore, the invention also involves providing an emission cleaning method which is characterized in that the photocatalyst pellets are accommodated in the interior of an ultraviolet light permeable cylinder body, and an emission cleaning installation, which is provided with a light source which radiates the light for exciting the above-described photocatalyst pellets on the outer side of the corresponding cylinder body, continuously adjoins the emission supply duct of the incineration furnace, whereby the emissions expelled from the incineration furnace are introduced at a constant, high temperature into the interior of the above-mentioned cylinder body and come into contact with the above-described photocatalyst pellets leading to environmental pollutants in the emissions being broken down by oxidation.

Furthermore., the invention also involves providing an emission cleaning method which is characterized in that the emission cleaning installation is provided with a housing section having an ultraviolet light permeable cylinder body, with photocatalyst pellets, which are accommodated in its interior and come into contact with the emissions expelled from the incineration furnace, and with a light source, which is fitted in the interior of the abovementioned cylinder body and photoexcites the abovementioned photocatalyst pellets.

Said emission cleaning installation, comprises a plurality of spaces which alternately communicate with one another on the upper cover side and baseplate side or on opposite side wall sides continuously adjoining the emission supply duct, whereby the above-mentioned emissions are introduced into the abovementioned spaces at a constant, high temperature and then come into contact with the abovementioned photocatalyst pellets leading to environmental pollutants which are contained in the emissions being broken down and eliminated.

Furthermore, the invention also involves providing an emission cleaning method which is characterized in that the cleaning installation is provided with a filter container, the interior of which is filled with filtration materials, with a photocatalyst container, which continuously adjoins the corresponding filter container in a freely removable manner via or without the heat-resistant component and the interior of which is filled with photocatalyst pellets, and with a component for expelling emissions, which continuously adjoins the corresponding photocatalyst container via or without a heat-resistant component. The abovementioned photocatalyst container is designed in such a way that it contains a plurality of cylindrical housings, which pass through the interior of the corresponding photocatalyst container and allow ultraviolet light to pass through, and a light source, which is fitted in each housing and photoexcites the abovementioned photocatalyst pellets, and continuously adjoins the emission supply duct of the incineration furnace with a connecting component between them. The emissions are introduced into the interior of the above-mentioned photocatalyst container at a constant, high temperature and come into contact with the abovementioned photocatalyst pellets leading to environmental pollutants which are contained in the emissions expelled from the abovementioned incineration furnace being broken down and eliminated.

Accordingly, an object of the present invention is to provide an emission cleaning installation and an emission cleaning method, in particular an emission cleaning installation which can readily be continuously connected even to existing large-scale incineration furnaces, and which is able to break down and eliminate by oxidation the components such as, for example, dioxins, dibenzofurans, coplanar PCBs, nitrogen oxides (NOx) and the like which are contained in the emissions without temperature control of the emission temperature, by photocatalytic action, and providing a method for cleaning and eliminating emissions which uses the abovementioned emission cleaning installation.

Another important object of the present invention is to provide an emission cleaning installation having an ultraviolet light permeable cylinder body, which passes through ultraviolet light and through which the emissions supplied from the above-mentioned incineration furnace pass. Said cylinder body has photocatalyst pellets which are accommodated in the interior of the abovementioned cylinder body and come into contact with the abovementioned emissions, and a light source which is arranged on the outer side of the abovementioned cylinder body and radiates exciting light for exciting the abovementioned photocatalyst pellets. Said installation can be continuously connected to the emission supply duct (flue duct) of the existing large-scale incineration furnace.

A further object of the present invention is to provide an emission cleaning installation which has a plurality of spaces which alternately communicate with one another on the upper cover side and the baseplate side or on opposite side wall sides, each space being designed in such a way that it is provided with a housing. Said housing has an ultraviolet light permeable cylinder body, with photocatalyst pellets, which are accommodated in the abovementioned spaces and with which the emissions expelled from the abovementioned incineration furnace come into contact, and a light source, which is provided in the interior of the abovementioned cylinder body and radiates the exciting light which excites the abovementioned photocatalyst pellets. Said installation can be continuously connected to the emission supply duct of the existing large-scale incineration furnace.

Yet another object of the invention is to provide an emission cleaning installation which continuously adjoins the emission supply duct of the incineration furnace, with a connecting component between them, and is provided with a rectangular filter container, the interior of which is filled with filtration materials, with a photocatalyst container, which continuously adjoins the abovementioned filter container in a freely removable manner via or without a heat-resistant component and the interior of which is filled with photocatalyst pellets, and with a component for expelling emissions, which continuously adjoins the abovementioned photocatalyst container via or without a heat-resistant component. The abovementioned photocatalyst container is provided with a plurality of cylindrical housings, which allow ultraviolet light to pass through the interior of the corresponding photocatalyst container, and with a light source, which is fitted in each housing and radiates light for exciting the abovementioned photocatalyst pellets. In particular, in the exemplary embodiment which has just been described, the abovementioned filtration materials are designed in such a way that they contain either spherical ceramics or silica gel with an alkali-treated diameter of from 5–25 mm. A removal hole for the photocatalyst is formed at the bottom end section of the side wall of the photocatalyst container, and the base surface is designed to slope from its central section downwards towards the abovementioned removal hole, in the form of a gable or hipped roof.

Furthermore, in accomplishing each of the abovementioned objects in the preferred exemplary embodiments, the photocatalyst pellets used are such that either the surface of porous metal supports or the surface of porous ceramics or the surface of woven fabric which weaves in heat-resistant fibres, nonwoven, knitted fabrics, or the surface of any other type of fibrous structures are coated with a titanium oxide coating of the anatase form as the crystalline form.

Furthermore, in accomplishing the objects of the present invention in the preferred exemplary embodiments described above, it is also possible to use photocatalyst pellets which are such that the surface of the titanium oxide coating is coated again with a type of metal coating which is selected from groups consisting of platinum, rhodium, ruthenium, palladium, iron, silver, copper and zinc.

Furthermore, in accomplishing the objects of the present invention in the preferred exemplary embodiments described above, the light source used comprises a combination of a disinfecting lamp, which has its maximum wavelength in the vicinity of 254 nm and radiates ultraviolet light, and a black light lamp, which has its maximum wavelength in the vicinity of 380 nm and radiates ultraviolet light, and consequently, the exciting light can be radiated to a sufficient extent onto all the photocatalyst pellets.

DESCRIPTION OF THE PREFERRED EMBODIMENTS

Figure 1:
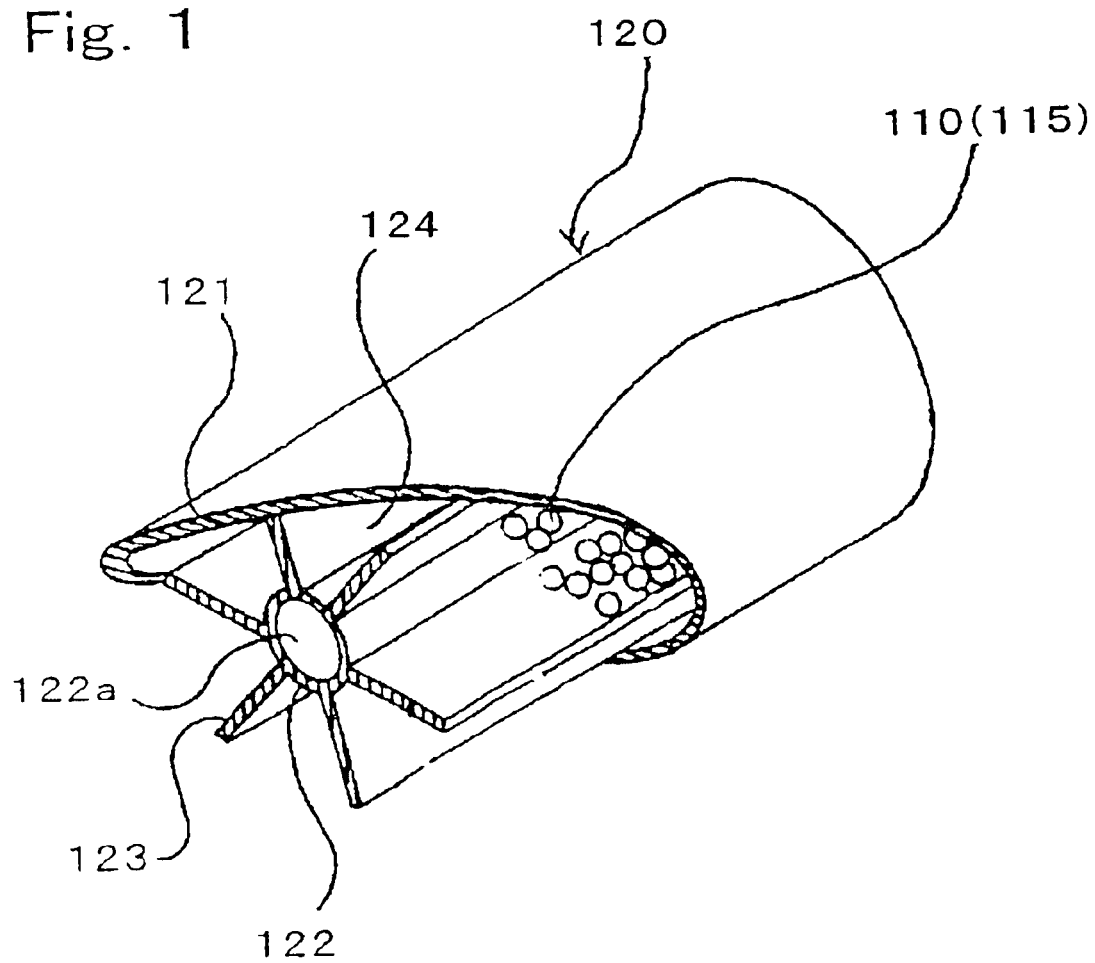
FIG. 1 represents a partially cut-away perspective drawing which shows the emission cleansing installation of the first exemplary embodiment arranged in series with the emission outlet duct. Only some of the photocatalyst pellets are shown.

In an advantageous embodiment of the invention, the photocatalyst pellets are coated onto the surface of the porous support, or onto the surface of woven fabric which comprises heat-resistant fibres, or onto the surface of nonwoven, knitted fabrics, or onto the surface of any other type of fibrous structures with a titanium oxide coating in the anatase form as the crystalline form, or are attached to fine titanium oxide particles in the anatase form as the crystalline form.

Porous supports which may be mentioned include porous metals, of which nickel-cadmium, stainless steel, permalloy, aluminium alloys, copper and the like are representative examples, and porous ceramics, of which activated carbon, activated alumina, silica gel, porous glass materials and the like are representative examples. Moreover, it is also possible for the surface of the titanium oxide coating in turn to be coated with a metal coating of platinum, rhodium, ruthenium, palladium, iron, silver, copper, zinc and the like, and in addition it is also possible to use woven fabric, which comprises heat-resistant fibres mixed with photocatalyst, nonwoven, knitted fabric or any other type of fibrous structure. With a view to achieving a larger surface area and with regard to cost, it is advantageous to use porous ceramics made from activated carbons, activated aluminas, silica gel and the like as the support, and they may be in the shape of grains, platelets, cylinders, prisms, cones, spheres, rugby balls and the like, and may be in any form.

Within the context of the present description, the term "titanium oxide" may be replaced by a mixture or more than two mixtures selected from groups consisting of titanium oxide, tin oxide, zinc oxide, vanadium oxide, dibismuth trioxide, tungsten trioxide, ferric oxide, strontium titanate and cadmium sulphide, and can be understood as described above.

If the photocatalyst is titanium oxide, photocatalyst pellets can be produced by coating, for example, either titania sol which can be obtained by suspending fine titanium oxide particles in water or titania sol which can be obtained by hydrolysis of organic titanate onto the surface of the abovementioned porous support by means of dip-coating processes, dropping processes, spraying processes and the like and then firing.

Furthermore, it is possible to coat the surface of the titanium oxide coating, thereby covering the surface of the porous support with an additional metal coating of platinum, rhodium, ruthenium, palladium, iron, silver, copper, zinc and the like by means of a photo-electrodeposition process or CVD process and PVD processes of cathode sputtering or vacuum deposition and the like, thus facilitating the breakdown of the electric charge of electrons and holes and thereby accelerating the oxidative breakdown by the photocatalytic action. The oxidative breakdown or reduction decomposition can be introduced by using the abovementioned metal catalyst as an additional agent.

The heat-resistant fibres described above may be organic or inorganic if they are able to withstand temperatures of over 400° C., preferably of approximately 800° C. With a view to achieving excellent heat resistance it is preferably possible to use the inorganic fibres of which glass fibres, alumina fibres, aluminosilicate fibres and silicon carbide fibres are representative.

Furthermore, the term "photocatalyst" is understood as meaning a substance which is produced in such a way that electron excitation during irradiation with light (exciting light) of relatively high energy (i.e. short wave) creates an energy gap between the conduction band and valence band of a crystal in valence bands (photoexcitation)and as a result electrons and holes are formed; examples which may be mentioned include titanium oxide, tin oxide, zinc oxide, vanadium oxide, dibismuth trioxide, tungsten trioxide, ferric oxide, strontium titanate, cadmium sulphide, of which it is possible to use one type or more than two types. The use of titanium oxide is preferable since its photocatalytic action is better than that of the others. In addition, crystalline titanium oxides are to be found in anatase form, rutile form and brookite form. Although any of these forms can be used, the anatase form is preferred, since its photocatalytic action is better than that of the others.

If the photocatalyst is photoexcited by the ultraviolet light, an electron/hole pair is formed on the surface of the photocatalyst. Of this pair, the electron allows superoxide anions ($O_2^-$) to form on the surface by reduction of oxygen, and the hole allows hydroxyl radicals (.OH) to form on the surface by oxidation of hydroxyl. These highly reactive, actively oxidizing substances (i.e. superoxide anions and hydroxyl radicals) allow the environmental pollutants in the emissions to be broken down by oxidation and then reliably rendered harmless.

Moreover, fine photocatalyst pellets can be coated or attached to the surface of heat-resistant woven fabric, nonwovens, knitted fabrics or any other type of fibrous structure using the same production process as described above.

If the light source is to be specified in more concrete terms, it is possible, for example, to mention sunlight, a disinfecting lamp, a black light lamp, a fluorescent lamp, an incandescent lamp, a mercury lamp, a UV lamp, a xenon lamp, a halogen lamp, a metal halogen lamp and the like. Moreover, if a combination of a disinfecting lamp, which radiates ultraviolet light with its maximum wavelength in the vicinity of 254 nm, and a black light lamp, which radiates ultraviolet light with a maximum wavelength in the vicinity of 380 nm, is used it is possible to excite the surface of the photocatalyst pellets by allowing the ultraviolet light radiated from the disinfecting lamp and the ultraviolet light radiated from the black light lamp, to pass into the interior by passing through the photocatalyst pellets. This means that the exciting light is able to sufficiently irradiate all the photocatalyst pellets with which the photocatalyst container is filled and thus sufficiently excite the photocatalyst.

Although it is possible for cylinder bodies, which accommodate the light source to be designed in such a way, that only one end thereof is open to the outside, if both ends thereof are open to the outside, the light source can be air-cooled. It is particularly preferable for a blower which supplies wind for air cooling (ventilation means) from one end to the other, to be arranged on the outside of the cylinder body, since the light source can be air-cooled more efficiently and thus its service life can be controlled.

Embodiments of the emission cleaning installation are explained in more detail below with reference to the exemplary embodiments which are specifically illustrated in the drawing. These embodiments are only representative and are therefore not intended to restrict the invention in any way to the exemplary embodiments described below, provided that the present invention does not go beyond their basic core.

EXAMPLE 1

In the first exemplary embodiment, emission cleaning installation 100 may be designed in such a way that a plurality of these emission cleaning installations adjoin one another in series as a group and then continuously adjoin the emission outlet duct, or that a plurality of these emission cleaning installations continuously adjoin the emission outlet duct in parallel, as a group, in a plurality of rows, or that a plurality of groups of emission cleaning installations adjoining one another in series are provided and these in turn continuously adjoin the emission outlet duct in parallel, as a group, in a plurality of rows.

The emission cleaning installation 100 from the first exemplary embodiment is aimed at any arrangement continuously adjoining the emission outlet duct 3 of the incineration furnace 1; specifically, it is intended to include both types of emission cleaning installations, namely those which are fitted as an indispensable structural unit when the furnace is designed and those which are connected downstream of the emission outlet duct 3 of the existing incineration furnace. They may be fitted in a freely removable manner with respect to the emission outlet duct 3 and may be secured unreleasably.

In the following text, to facilitate matters the emission cleaning installation 100 is explained by way of example on the basis of being used on its own.

Figure 2:
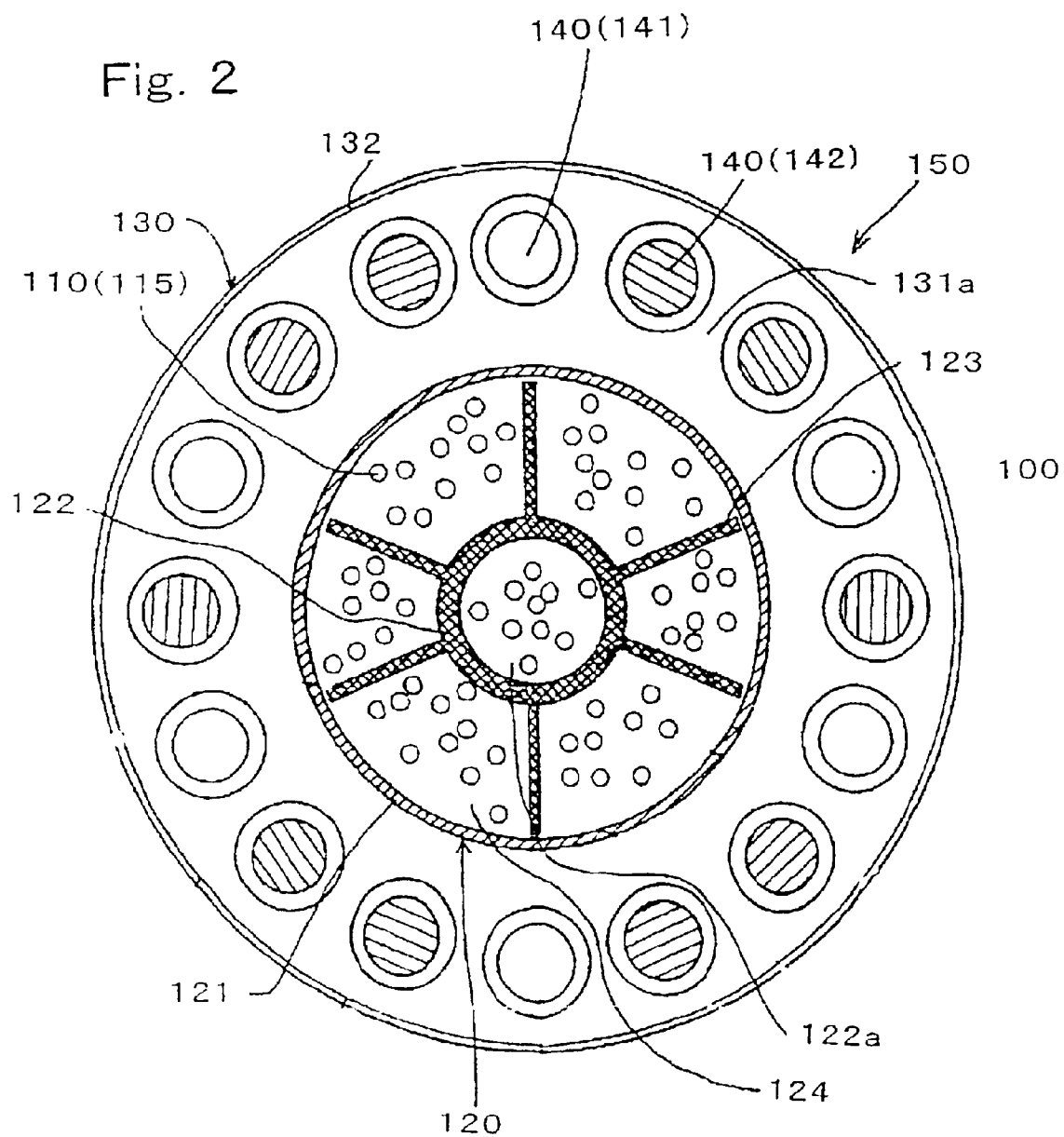
FIG. 2 depicts a longitudinal section of the abovementioned emission cleaning installation.

In FIG. 2, this emission cleaning installation 100 is designed in such a way that it is provided with a ultraviolet light permeable cylinder body 120, through which the incineration emissions expelled from the incineration furnace 1 pass, with photocatalyst pellets 110, which are accommodated in the interior of the corresponding cylinder body 120 and come into contact with the incineration emissions, and with a light source 140, which is arranged on the outer side of the cylinder body 120 and radiates the exciting light 140 which is to excite the photocatalyst 115, and the entire unit is fitted in the housing 130 so that it adjoins the incineration emission outlet duct 3 of the incineration furnace 1.

Looking at FIG. 1, the cylinder body 120 comprises an outer cylinder 121 made from quartz glass and an inner cylinder 122 made from quartz glass and is therefore of dual design, and six reinforcing panes 123 of quartz glass are arranged between the outer cylinder 121 and the inner cylinder 122, and both chambers, namely chamber 122a in the inner cylinder 122 and chamber section 124 between the outer cylinder 121 and the inner cylinder 122, are filled with photocatalyst pellets 110, the transparent silica gel surface of which is coated with photocatalyst (titanium oxide coating). The outer cylinder 121, the inner cylinder 122 and the reinforcing pane 123 are each subjected to an embossing treatment and are designed in such a way that the exciting light radiated from the light source is reflected irregularly and that they, including the photocatalyst pellets 110 situated in the central section of the cylinder body 120, can be photoexcited homogeneously. Moreover, the abovementioned cylinder body 120 (outer cylinder 121 and inner cylinder 122) and the reinforcing pane 123 are designed in such a way as to be transparent and to allow ultraviolet light to pass through, and consist of heat-resistant materials, and in addition to quartz glass, they may also, for example, consist of fused quartz glass, vitreous silica, light-transmitting alumina.

Figure 4:
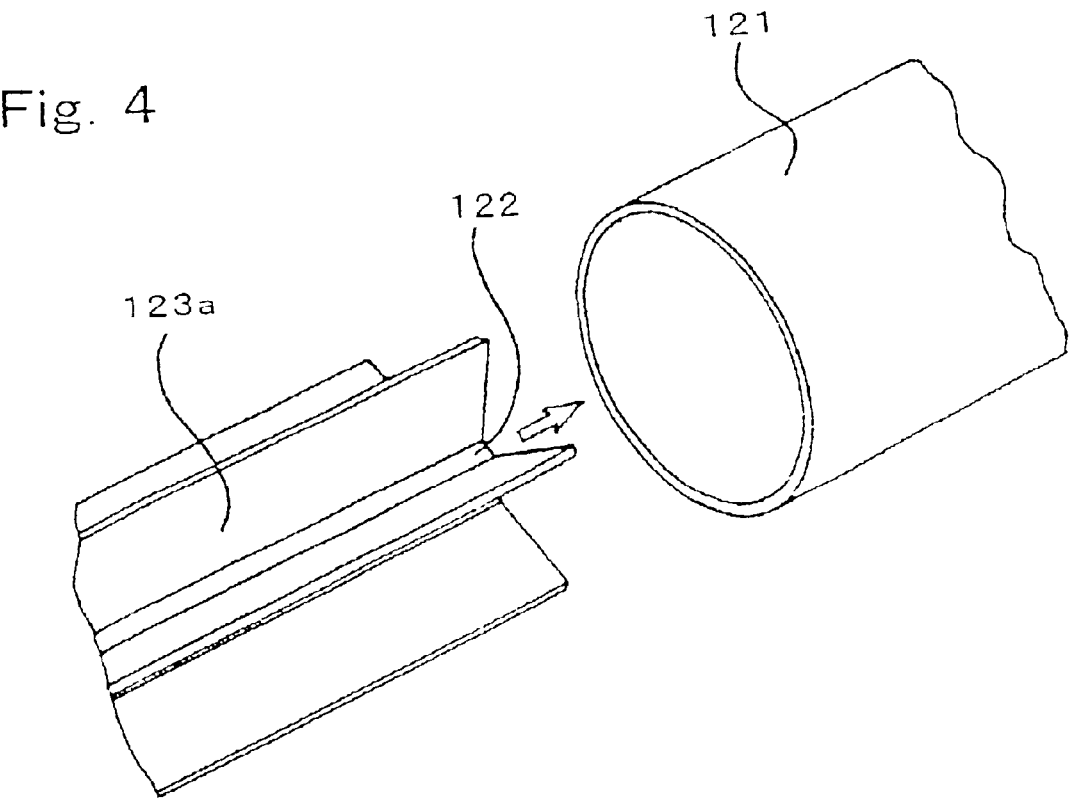
FIG. 4 depicts a detailed perspective drawing of the cylinder body. The inner cylinder is accommodated in the interior of the outer cylinder, being designed in such a way that it is provided with reinforcing panes on the outer side. The photocatalyst pellets are not shown.
Figure 5:
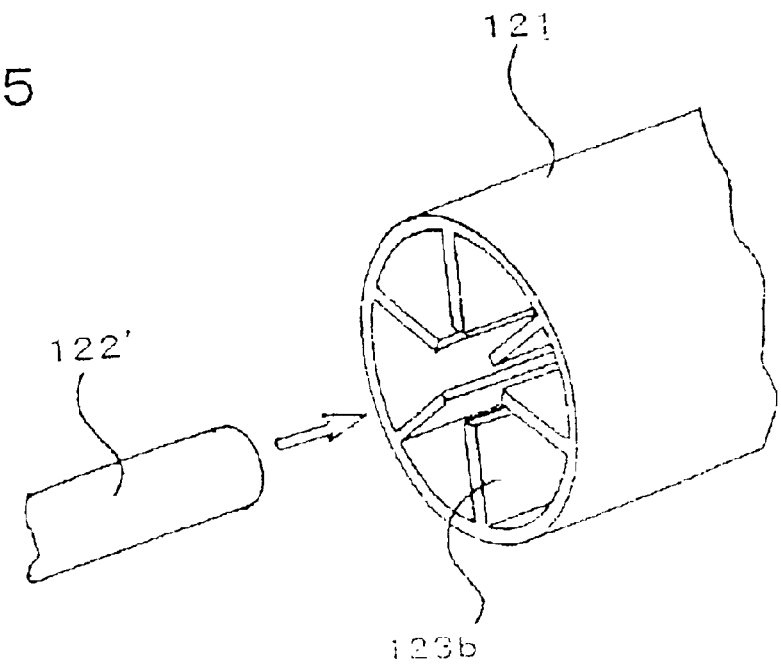
FIG. 5 depicts a detailed perspective drawing of a further cylinder body. The inner cylinder is designed in such a way that it is fitted in the interior of the outer cylinder, the inner side of which is provided with a reinforcing pane. Photocatalyst pellets are not shown.

Furthermore, as shown in FIG. 4, they may be designed in such a way that the inner cylinder 122, which is provided with the reinforcing pane 123a on the outer side, is accommodated in the interior of the outer cylinder 121, or in such a way that the inner cylinder 122', as shown in FIG. 5, is accommodated in the interior of the outer cylinder 121' which is provided on the inside surface with the reinforcing pane 123b.

Figure 3:
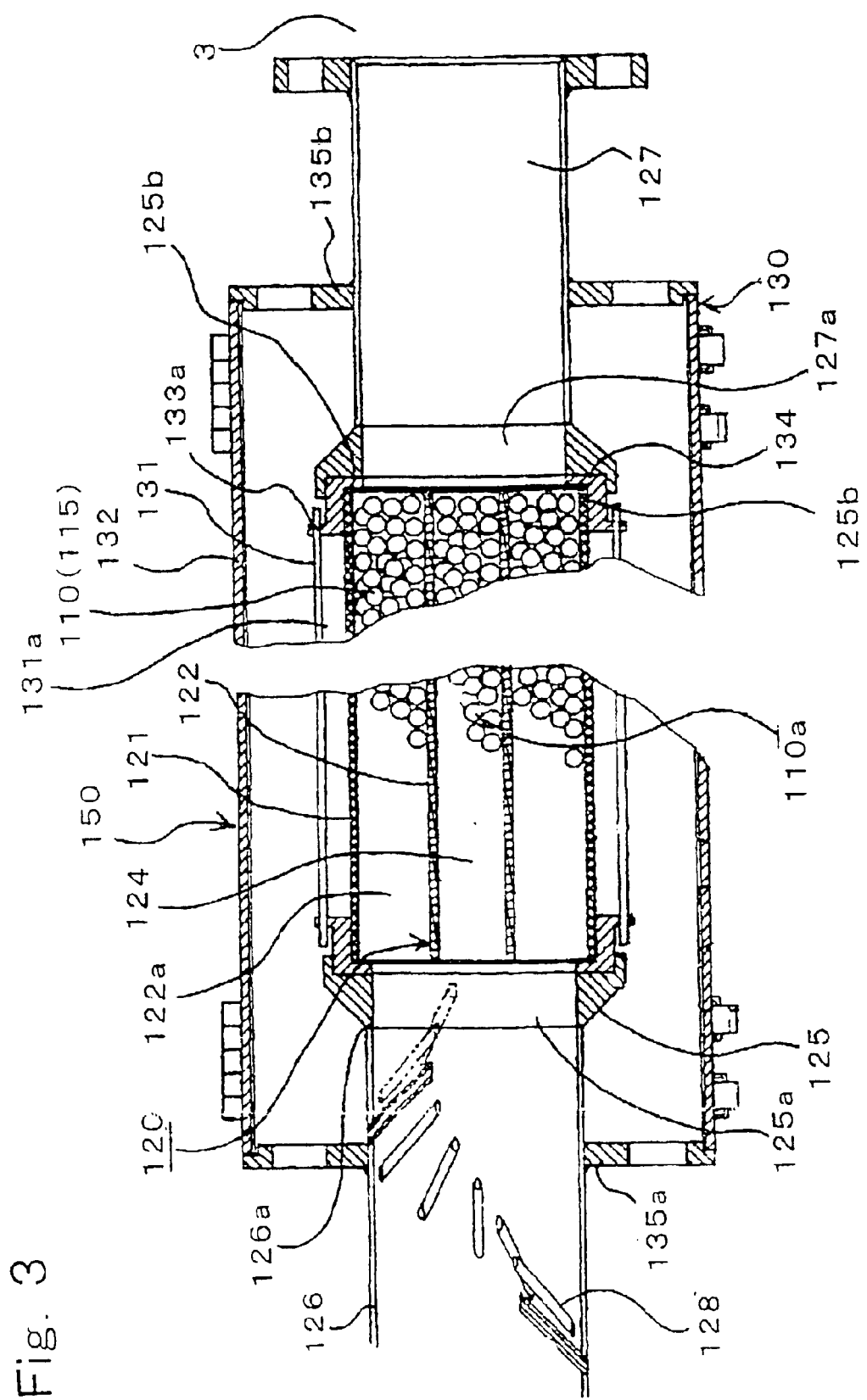
FIG. 3 depicts a cross section of the abovementioned emission cleaning installation. The light source has been omitted.

Referring now to FIG. 3, at the end section of the cylinder body 120 there is to be found cover component A 125, which has an insertion hole 125a, covering in an airtight manner in each case via a heat-resistant endless ring 125b, and emission guiding component 126, the tip section 126a of which is fitted into the insertion hole 125a, and there is also emission expulsion component 127, the tip section of which is fitted in the insertion hole 127a, communicating with one another in an airtight manner in such a way that the emissions do not leak out. Moreover, each other end section of the emission guiding component 126 and the emission expulsion component 127 communicate in each case with the emission outlet duct 3 in series and in an airtight manner.

Moreover, twelve tubes 128 for supplying air, which communicate from the outside of the abovementioned emission guiding component 126 to the inside, are arranged in helical form on the emission guiding component 126, and sufficient amounts of oxygen can be fed towards the central section of the inner cylinder 122.

The housing 130 has inner surrounding wall 131 made from quartz glass and outer surrounding wall 132 made from stainless steel, and on the inside surface of the outer surrounding wall 132 there are six disinfecting lamps 141, which are at even distances apart, and in each case two black light lamps 142 at regular intervals between the disinfecting lamps 141, making a total of twelve black light lamps (FIG. 2). The cylinder body 120 is accommodated in the interior 131 a which is surrounded by the inner surrounding wall 131 of the housing 130.

The tip of the emission guiding side of the inner surrounding wall 131 of the housing 130 is covered by a covering component, which has a round groove 133a, and the fact that the tip section of the inner surrounding wall 131 of the housing 130 is pushed into this round groove 133a and therefore sealed, means that they communicate in an airtight manner such that the emissions do not leak outwards.

Next the covering component A125, which is provided with the cylinder body 120, and the covering component, which is provided with the housing 130, are sealed in an airtight manner such that the emissions cannot escape outwards, with a heat-resistant O-ring 134 between them, and in this way the emissions which are introduced from the emission guiding element 126 are passed via the interior of the cylinder body 120 to the emission expulsion component 127.

Moreover, at the tip of the emission guiding side of the outer surrounding wall 132 of the housing 130 there is a covering component A135a, which is pushed into the central section of the emission guiding component 126, lying in between, and the circumference of which is fitted in a sealed state, and the tip of the emission expulsion side is also provided with the covering component B135b which is pushed into the central section of the emission expulsion component 127, lying in between, and the circumference of which is fitted in the sealed state.

Moreover, if a cooling-water circulation path for cooling the light source 140 is provided on the outside of the outer surrounding wall 132 of the housing 130 (not shown), this is a preferred arrangement, since it is possible to aim at extending the service life of the light source 140. Moreover, it is preferable for the entire cylinder body 120 to be designed as a Liebig condenser (not shown) and for the photocatalyst body 110 to be cleaned with water approximately once every month, by way of example.

Referring to FIGS. 1, 2, 3 and 6, according to emission cleaning installation 150 of the first exemplary embodiment, which is fitted in the manner described above, it is possible for emissions which are introduced from the emission outlet duct 3 expelled from the incineration furnace 1 to be fed via the emission guiding component 126 into the interior of the cylinder body 120 and to be expelled to atmosphere via the emission expulsion component 127.

Incineration emissions, which are introduced into the interior of the cylinder body 120, come into contact with the titanium oxide coating on the surface of the photocatalyst body 110 with which the interior of the cylinder body 120 is filled. Since the photocatalyst (titanium oxide) 115 in the titanium oxide coating is irradiated by the radiation of ultraviolet (exciting light) radiated from the light source 140 onto the outer side of the cylinder body 120 and the radiation of ultraviolet (exciting light) which is unevenly reflected and received by the embossed inner cylinder 122, the outer cylinder 121 and by the reinforcing pane 123, and since a sufficient quantity of air (in particular oxygen) can be mixed with the emissions via tube 128 for supplying air, and since the exciting action involves the thermal excitation of the titanium oxide, and these effects act synergistically, the result, as described above, is the formation of highly reactive, actively oxidizing substances, and these highly reactive, actively oxidizing substances result in an advantageous effect which is such that environmental pollutants in the emissions are broken down by oxidation extremely efficiently and rapidly, and can therefore be rendered harmless.

Figure 6:
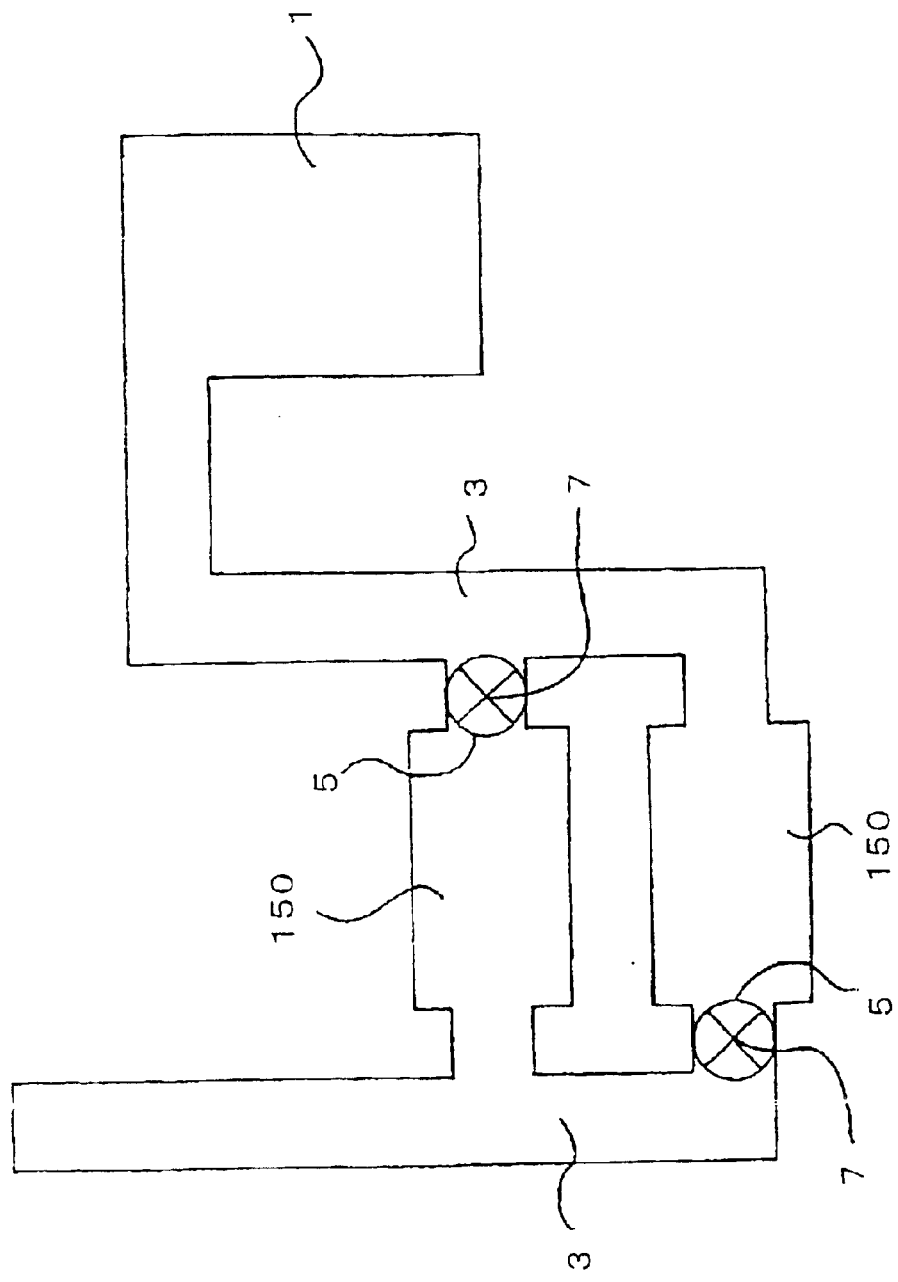
FIG. 6 shows a sequencing diagram which is illustrated diagrammatically in order to explain a further application method for the emission cleaning installation of the present invention. Two emission-cleaning installations are arranged in parallel with respect to the emission outlet duct, and a forced blower is fitted in the vicinity of the outlet opening of each emission cleaning installation.

If, as diagrammatically indicated in FIG. 6, an embodiment is then used in which two emission cleaning installations 150 are fitted practically in parallel with respect to the incineration emission outlet duct 3, and furthermore a forced blower 7 is fitted in the vicinity of the outlet opening 5 of each emission cleaning installation 150, it is possible for the emissions to be circulated through these two emission cleaning installations 150. It is also possible, by way of example, to fit a damping component (not shown) for preventing gases from flowing back in the vicinity of the connection between the emission cleaning installation 150 and the emission outlet duct 3.

EXAMPLE 2

Emission cleaning installation 200 of the second exemplary embodiment may also be designed in a similar way to the emission cleaning installation 100 from the first exemplary embodiment, in that a plurality of these installations adjoin one another in series as a group and adjoin the incineration emission outlet duct, or a plurality of emission cleaning installations adjoin one another in parallel, as a group, in a plurality of rows and these adjoin the incineration emission outlet duct, or it is possible to provide a plurality of emission cleaning installations which adjoin one another in series and a plurality of these groups adjoin one another in parallel, as a group, in a plurality of rows and these adjoin the incineration emission outlet duct. Moreover, it is also possible to include both types of emission cleaning installations, be it the emission cleaning installation which is fitted as an indispensable structural unit during construction of the incineration furnace, an installation which is subsequently connected downstream of the emission outlet duct of the existing incineration furnace, an installation fitted in a freely removable manner with respect to the emission outlet duct, or an installation which is secured unreleasably.

In the following text, the emission cleaning installation 200 of the second exemplary embodiment is also explained, for the sake of simplicity, on the basis only of the example of an application using the emission cleaning installation in question on its own.

Figure 7:
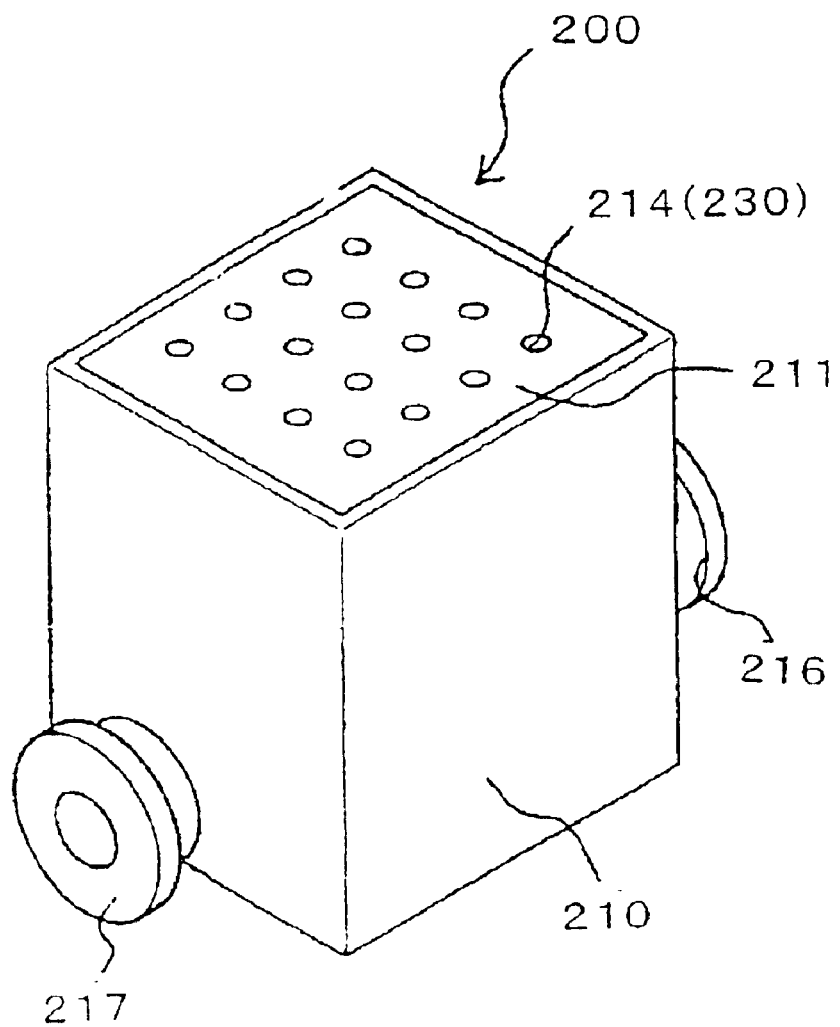
FIG. 7 depicts a perspective drawing which diagrammatically shows the outer structure of the emission cleaning installation of the second exemplary embodiment. Only some of the photocatalyst pellets are shown.
Figure 8:
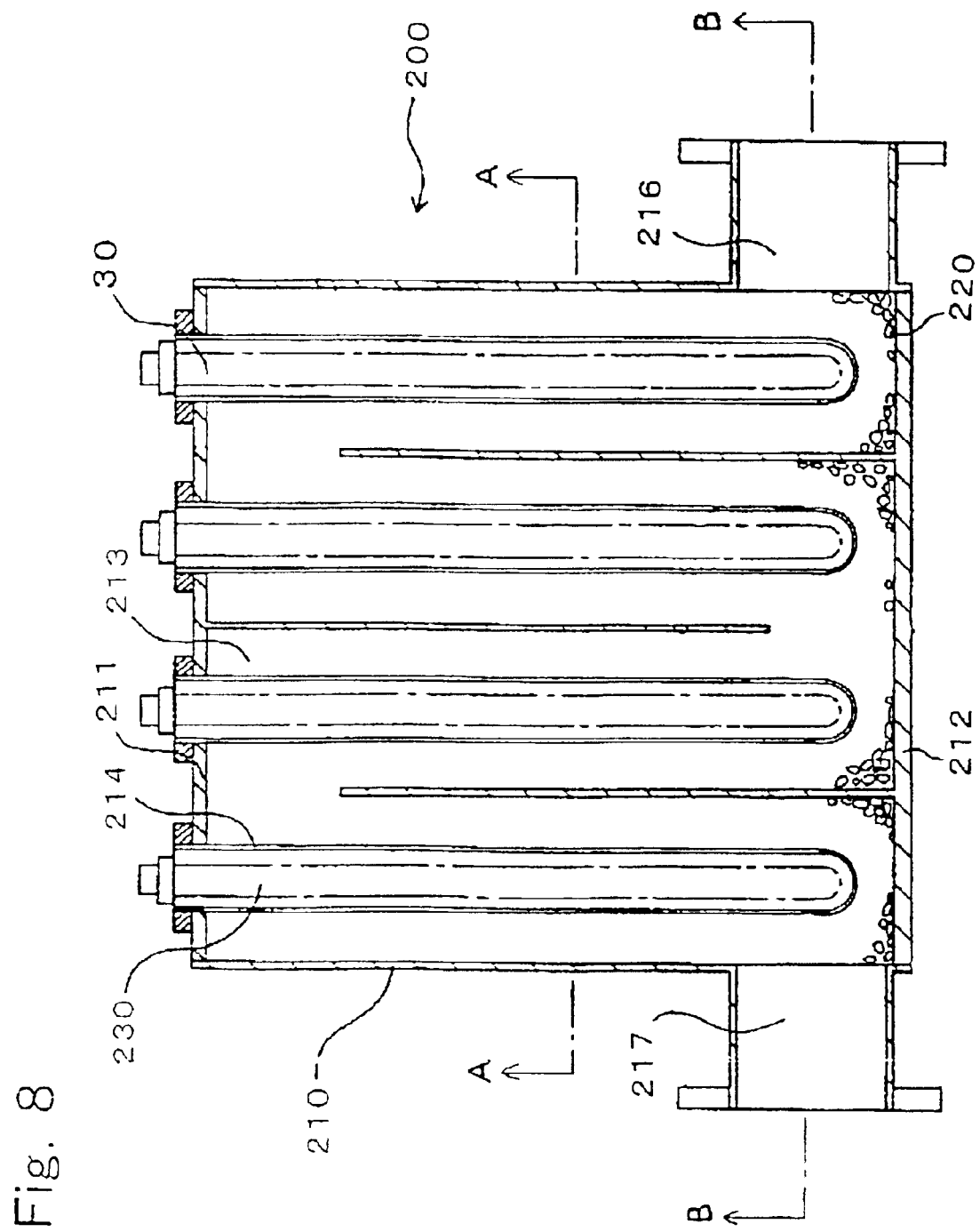
FIG. 8 depicts a longitudinal section through the emission cleaning installation shown in FIG. 7. Only some of the photocatalyst pellets are shown.

In FIGS. 7 and 8, this emission cleaning installation 200 is characterized in that alternately communicating spaces 213 are formed on the upper cover side 211 and the baseplate side 212, being provided with a housing 210, which in these spaces 213 has the ultraviolet light permeable cylinder body 214, with photocatalyst pellets 220, which are accommodated in each space 213 and come into contact with the emissions expelled from the incineration furnace, and with a light source 230, which is fitted in a freely removable manner in the abovementioned cylinder body 214 and radiates the exciting light which is to excite the abovementioned photocatalyst pellets 220. Moreover, in this emission cleaning installation 200 it is advantageous, since it is thus possible to prevent deterioration of the catalytic function of the photocatalyst 221, if the photocatalyst pellets 220 are cleaned with water once or twice a month, by way of example, and also because this makes it possible to reduce the laborious operation of changing photocatalyst pellets 220.

Housing 210 consists of stainless steel, and the first connecting section 216, which feeds the emissions towards the housing 210, and the second connecting section 217, which expels the emissions, are arranged opposite one another, and with respect to the emission outlet duct the two connecting sections 216, 217 communicate with one another in series and in an airtight manner. The interior of each space 213 is filled with the photocatalyst pellets 220 in which the surface of the transparent silica gel is coated with the photocatalyst (titanium oxide coating) 221.

Figure 10:
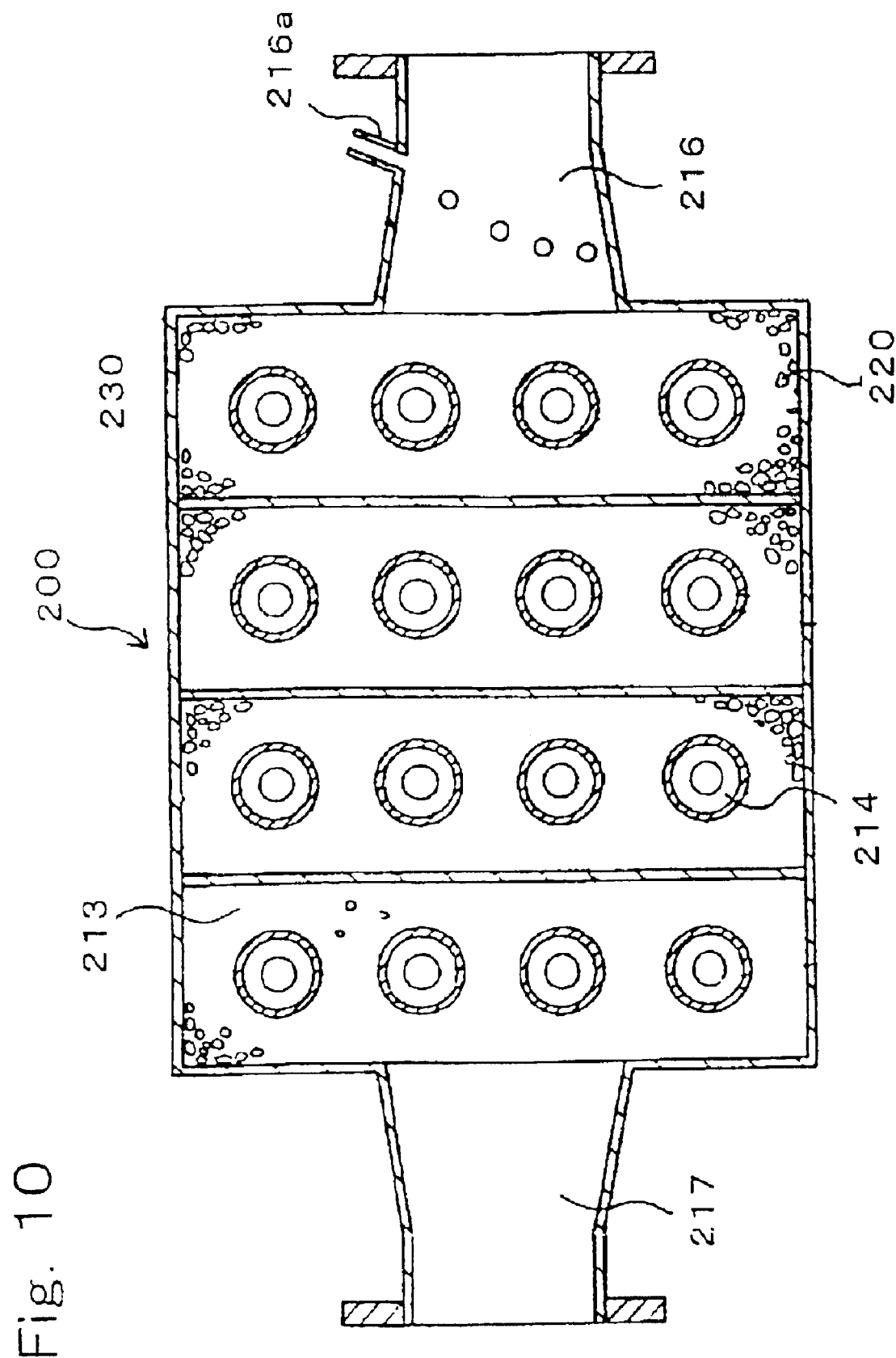
FIG. 10 represents a longitudinal section which is diagrammatically depicted as an example of a further embodiment of the first connecting section or the second connecting section which forms the emission cleaning installation in FIG. 7. Only some of the photocatalyst pellets are shown.

Moreover, all possible sizes and shapes of the first connecting section 216 and the second connecting section 217 are possible, with the exception of hollow cylinders; by way of example, they may, as shown in FIG. 10, be of frustoconical design, and this shape and size can be designed in each case as desired.

Although the shape and size of the housing 210 can be designed as desired according to the amount of emissions being treated, the flow velocity thereof and the like, if it is rectangular in cross section, the emissions fed into the housing can initially be brought together at the inner wall surface of the first space 213, and then they can be helically agitated at this point. Moreover, the emissions which are moving upwards in the space 213 can also be brought together against the inside of the top cover 211 and can also be agitated helically at this point. The same effect occurs in each space 213. Therefore, the opportunity of contact between the photocatalyst pellets 220 and the environmental pollutants in the emissions can be increased considerably, and therefore the extent to which the environmental pollutants are broken down can also be improved. Moreover, if the inner wall surface of the space 213 is alternately provided with a baffle plate (not shown), it is possible to further increase considerably the opportunity of bringing the photocatalyst pellets 220 and the environmental pollutants into contact with one another.

Figure 12:
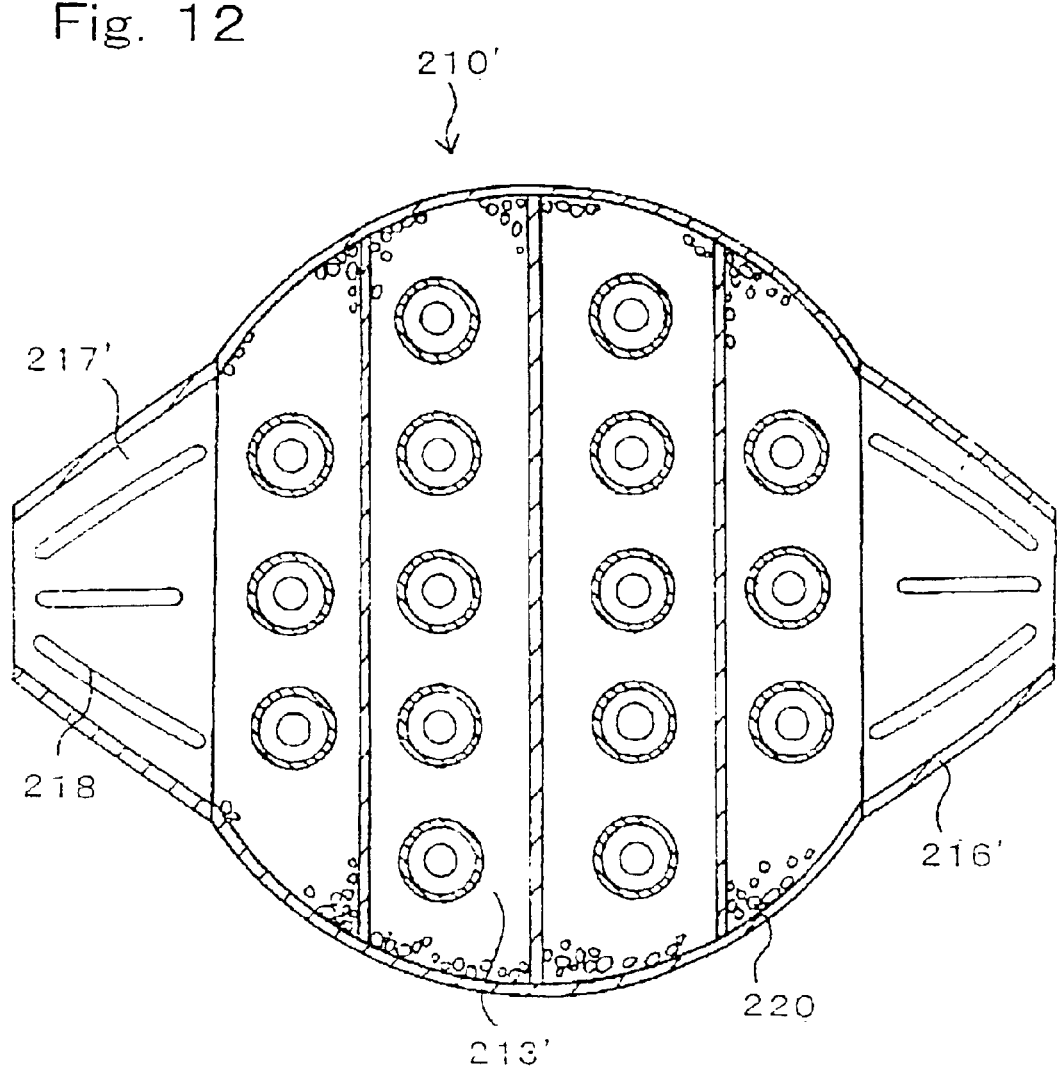
FIG. 12 represents a cross section which diagrammatically depicts an emission cleaning installation which corresponds to a further design in the second exemplary embodiment. This corresponds to the section on line B—B in FIG. 8. Only some of the photocatalyst pellets are shown.

Moreover, if the cross-sectional area of the housing 210', as shown in FIG. 12, is of elliptical or circular design and the space 213' is therefore of right-angled design, as indicated by a line which crosses the first connecting section 216' and the second connecting section 217', it is easier to produce the housing 210 and, even if the amount of raw materials is limited, it is still possible to ensure the maximum possible volume and, since the same effect as that described above can be obtained, this is an advantageous configuration.

Moreover, if at the first connecting section 216 a pipe 216a for supplying air, which provides communication from the outside inwards, is provided, for example, in the form of a spiral (an example of which is shown in FIG. 10), the outside air can be fed into the emissions and the two components can be mixed, having the advantage that sufficient oxygen can be supplied for the photocatalyst pellets 220. Moreover, it is possible, by way of example, for guide plate, baffle plate 218 and the like, as shown in FIG. 12, to be arranged on the inner wall of the first connecting section 216 (216') and/or on the inner wall of the second connecting section 217 (217').

Furthermore, it is also advantageous if the inner surface of each space 213 is polished to a mirror finish, since the exciting light can be reflected and because the photocatalyst situated on the opposite side of the light source 230 can be effectively excited, and also because the photocatalyst function can be utilized more efficiently.

Figure 9:
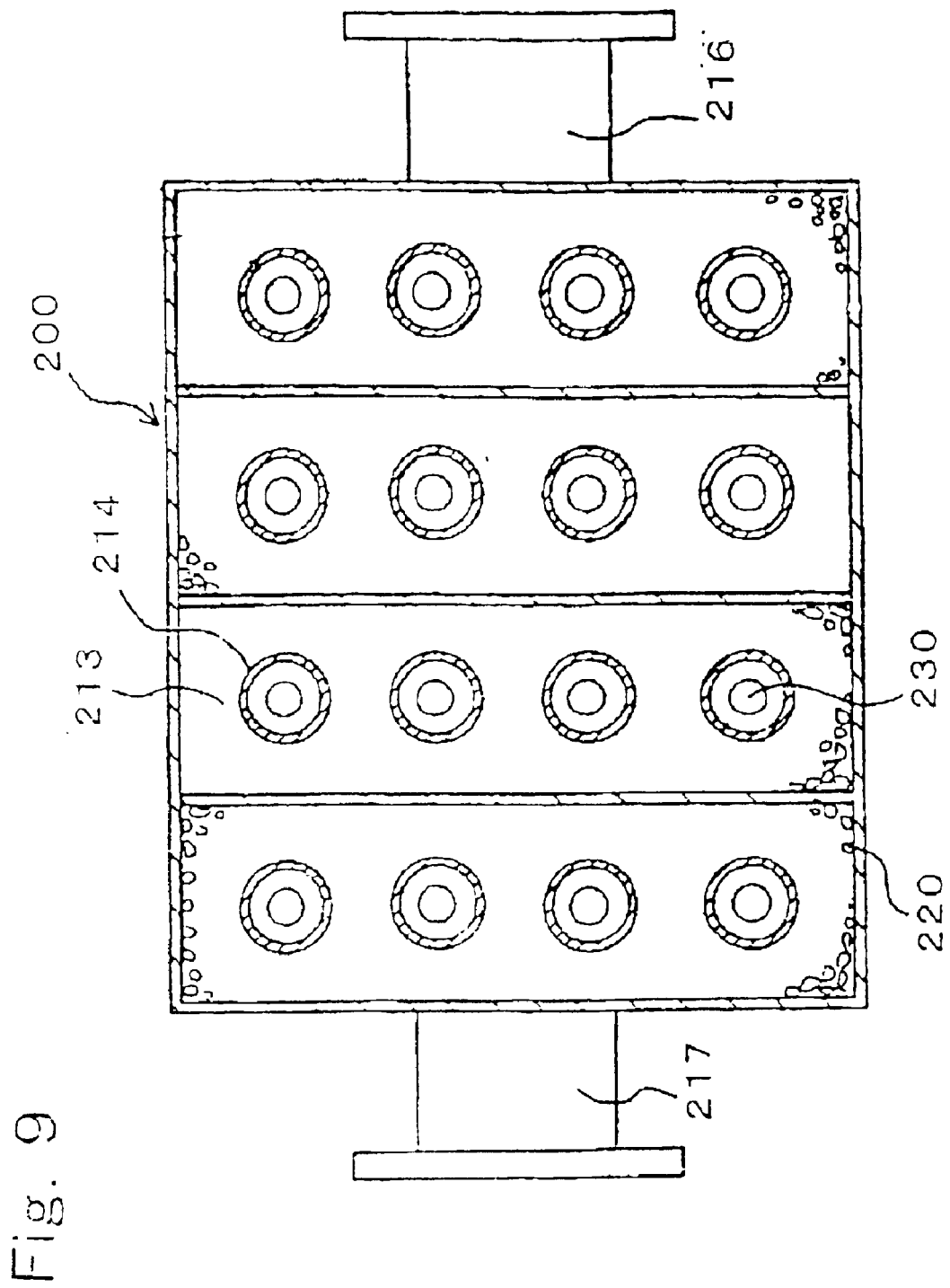
FIG. 9 represents a cross section on line A—A in FIG. 8. Only some of the photocatalyst pellets are shown.
Figure 11:
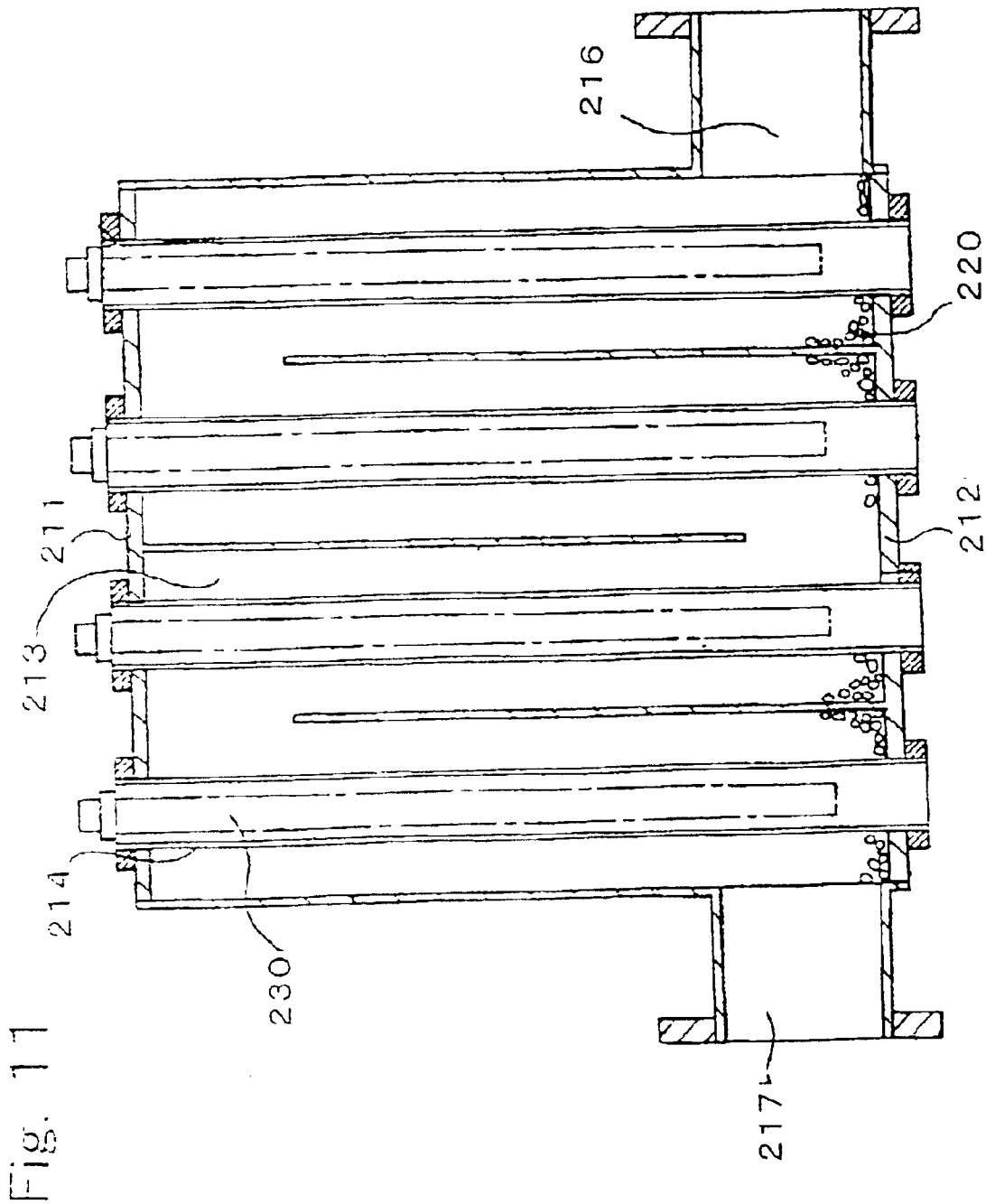
FIG. 11 represents a longitudinal section which diagrammatically depicts a further embodiment of the cylinder body which forms the emission cleaning installation in FIG. 7. Both ends of the cylinder body are opened to the outside. Only some of the photocatalyst pellets are shown.

The cylinder body 214 consists of quartz glass and is arranged at almost identical intervals in each space 213 in which the light source 230 is fitted in a freely removable manner. The cylinder body 214 may be of any desired design, if it is transparent and passes through ultraviolet light and consists of heat-resistant materials, and may also, in addition to quartz glass, consist, for example, of fused quartz glass, vitreous silica, light-transmitting alumina and the like. Moreover, although it can be designed in such a way that only one end of the cylinder body 214 is opened to the outside (FIG. 9), it is advantageous if both ends of the cylinder body 214 together are opened to the outside (FIG. 11), since the light source 221 can be effectively air-cooled and in this way it is possible to extend the service life of the light source 220. The number, arrangement and the like of cylinder bodies 214 to be arranged in each space 213 can be designed as desired according to the shape and size of the space 213, the amount of emissions to be treated, the flow velocity and the like.

In the emission cleaning installation 200 designed as described above, it is possible for emissions which are expelled from the incineration furnace and are passed to the emission outlet duct to be introduced into the space 213 via the first connecting section 216, so that they can pass through a plurality of spaces 213 and can be expelled to atmosphere from the second connecting section 217.

The emissions which are introduced into each space 213 come into contact with the titanium oxide coating which is applied to the surface of the photocatalyst pellets 220 with which its interior is filled. In the process, the photocatalyst (titanium oxide) in the titanium oxide coating is excited by irradiation with ultraviolet light(exciting light) which is radiated out of the light source 220 provided in the cylinder body 213, and is also excited by radiation of the ultraviolet light (exciting light) which is reflected from the inner wall surface, which has been polished to a mirror finish, of the cylinder body 213, and in addition the exciting effect caused by thermal excitation of the titanium oxide also participates, so that they act synergistically. Therefore, the highly reactive, actively oxidizing substances, as described above, can be formed on the surface of the photocatalyst pellets 220, and these highly reactive, actively oxidizing substances are able to effectively and rapidly break down the environmental pollutants in the incineration emissions by oxidation, thus rendering them harmless. Moreover, if, as described above, the design is such that a sufficient amount of air (in particular oxygen) can be mixed into the incineration emissions via the tube for supplying air, it is possible for the environmental pollutants in the incineration emissions to be broken down by oxidation even more effectively and rapidly.

Furthermore, an emission cleaning single body is designed in the shape of a box; the width is 45 cm, the depth is 40 cm and the height is 50 cm, while its interior is divided into six spaces which alternately communicate on the upper cover side and the baseplate side, and three cylinder bodies made from quartz glass are provided at regular intervals in each space, and two emission cleaning installation single bodies, which are filled with 60 liters of photocatalyst pellets with the photocatalyst (titanium oxide coating) applied to the surface of transparent silica gel, adjoin one another in tandem and continuously adjoin the stack of the incineration furnace provided in industrial waste disposal plants.

Furthermore, the emissions were in each case extracted from the emission inlet opening and from the outlet opening of the emission cleaning installation, and the concentration of dioxins in the abovementioned emissions was measured. The concentration of dioxins was measured according to the guidelines laid down by the Ministry of Health and Welfare "Manual for the Standard Measurement of Dioxins during Waste Disposal" (February 1997).

The measurement results are given in Table 1:

TABLE 1

| Measurement category | Unit | Test 1 Inlet/Outlet | | Test 2 Inlet/Outlet | | Test 3 Inlet/Outlet | | Test 4 Inlet/Outlet | |
|---|---|---|---|---|---|---|---|---|---|
| Total PCDDs | ng/m3N | 600 | 52 | 750 | 35 | 1800 | 23 | 1700 | 35 |
| Total PCDFs | ng/m3N | 1700 | 99 | 1600 | 41 | 3000 | 17 | 2700 | 30 |
| Total (PCDDs + PCDFs) | ng/m3N | 2300 | 150 | 2400 | 75 | 4800 | 40 | 4400 | 65 |
| Total PCDDs | ngTEQ/m3N | 13 | 0.87 | 14 | 0.46 | 30 | 0.21 | 28 | 0.43 |
| Total PCDFs | ngTEQ/ | 30 | 2.3 | 28 | 0.97 | 55 | 0.32 | 49 | 0.65 |

TABLE 1-continued

| Measurement category | Unit | Test 1 Inlet/Outlet | | Test 2 Inlet/Outlet | | Test 3 Inlet/Outlet | | Test 4 Inlet/Outlet | |
|---|---|---|---|---|---|---|---|---|---|
| Total (PCDDs + PCDFs) | $m^3N$ $ngTEQ/$ $m^3N$ | 43 | 3.2 | 41 | 1.4 | 85 | 0.53 | 78 | 1.1 |
| Proportion of dioxins eliminated | % | — | 92.6 | — | 96.6 | — | 99.4 | — | 98.6 |

PCDDs: polychlorinated dibenzo-para-dioxins
PCDFs: polychlorinated dibenzofurans In Tests 1 and 4, although the concentration of dioxins in the emissions expelled from the incineration furnace of the plant under examination lies in the range from 41 ng TEQ/$m^3N$–85 ng TEQ/$m^3N$, if they are treated using the emission cleaning installation according to the invention, it has been found that the concentration is reduced considerably to a range of from 0.53 ng TEQ/$m^3N$–3.2 ng TEQ/$m^3N$, and the level of dioxins eliminated lies in the range from 92.6%–99.4%.

Furthermore, the total quantity of dioxins contained in the extracts taken from the recovered photocatalysts—although not representing an actual value or the like—based on the total quantity of dioxins in the treated incineration emissions is at most approximately 1–3%. This demonstrated that the dioxins eliminated in each test did not adhere to the photocatalyst bodies, but rather they were, as it were, broken down by oxidation by the photocatalytic action of the photocatalyst pellets.

Moreover, it was found that it is possible to use photocatalyst pellets which were previously excited by ultraviolet radiation.

EXAMPLE 3

This emission cleaning installation 300 applies to both forms, on the one it is fitted as an indispensable structural unit during construction of the incineration furnace, and secondly that in which it is retrofitted in the flue duct of the existing incineration furnace, and it may also be secured irremovably with respect to the flue duct, but it is preferable for the installation to be fitted in such a manner that it can be removed freely.

Figure 13:
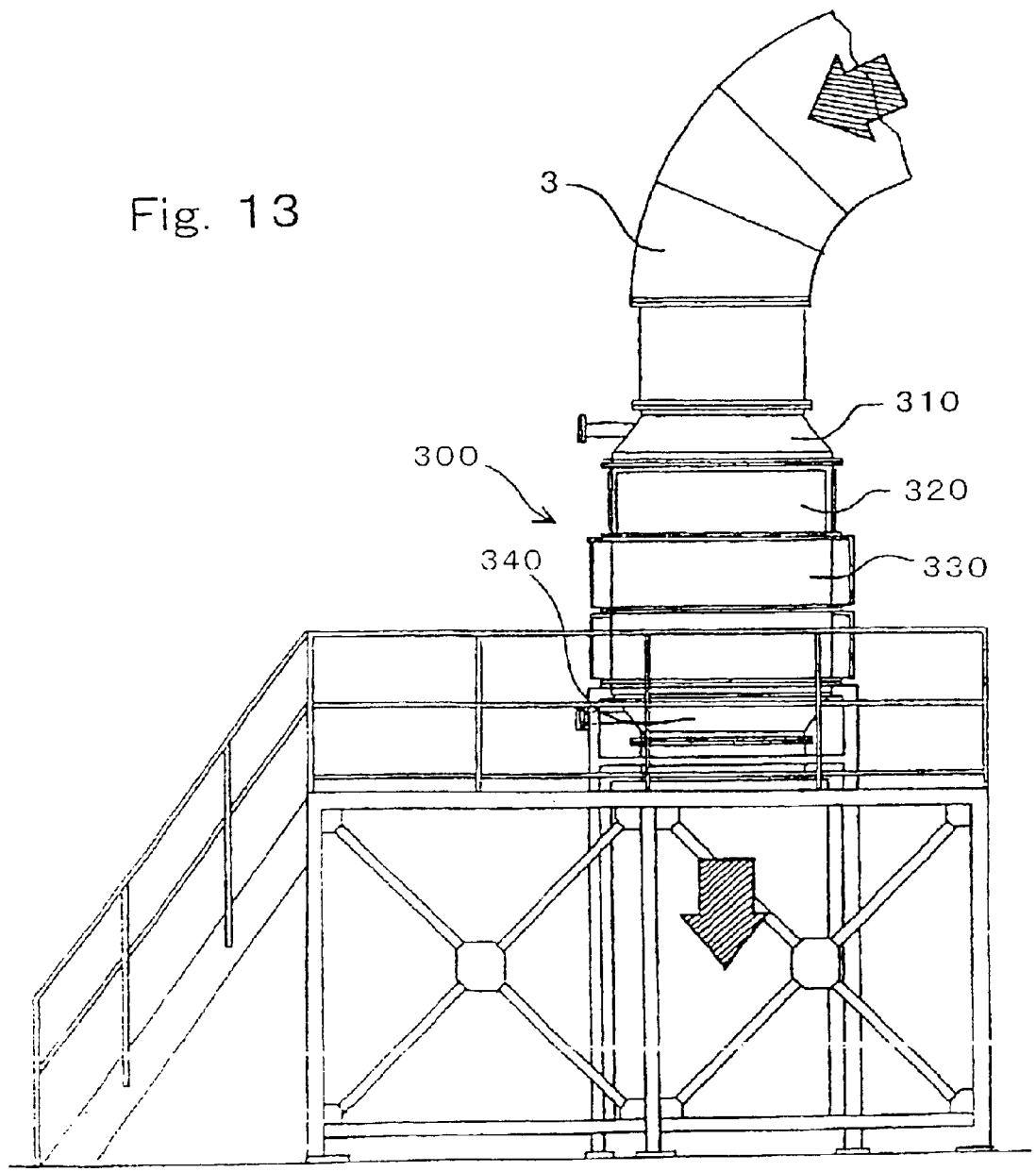
FIG. 13 represents a perspective drawing which diagrammatically depicts the entire outer structure in which the emission cleaning installation of the third exemplary embodiment is installed.
Figure 14:
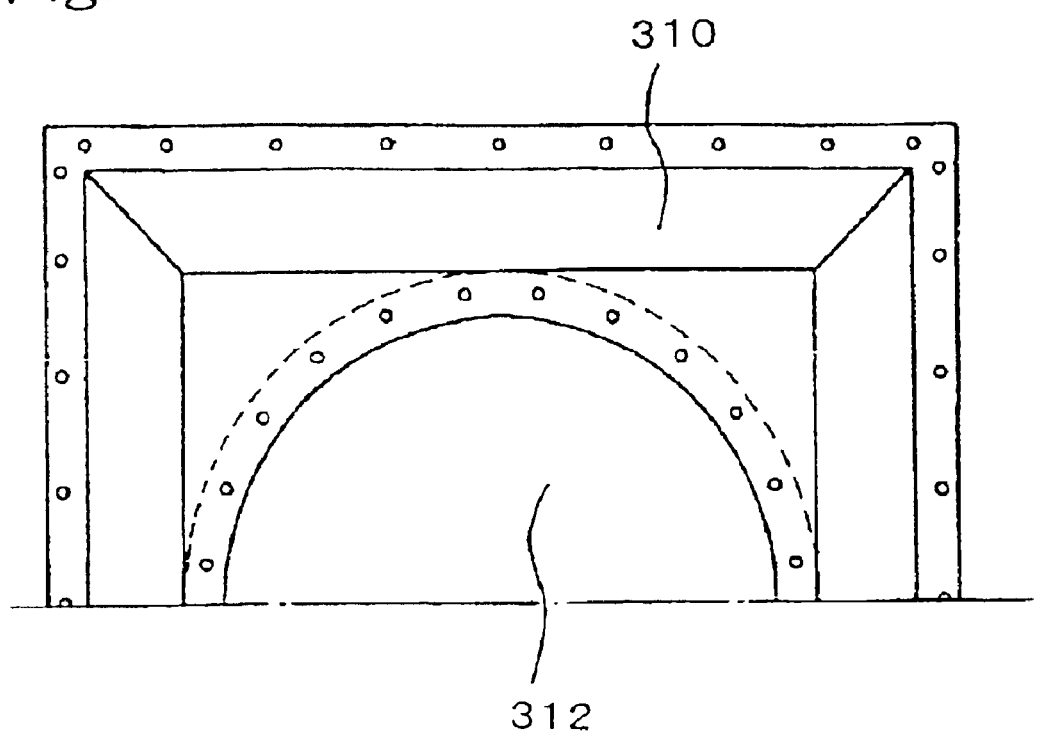
FIG. 14 represents a plan view of the connecting component from FIG. 13.
Figure 15:
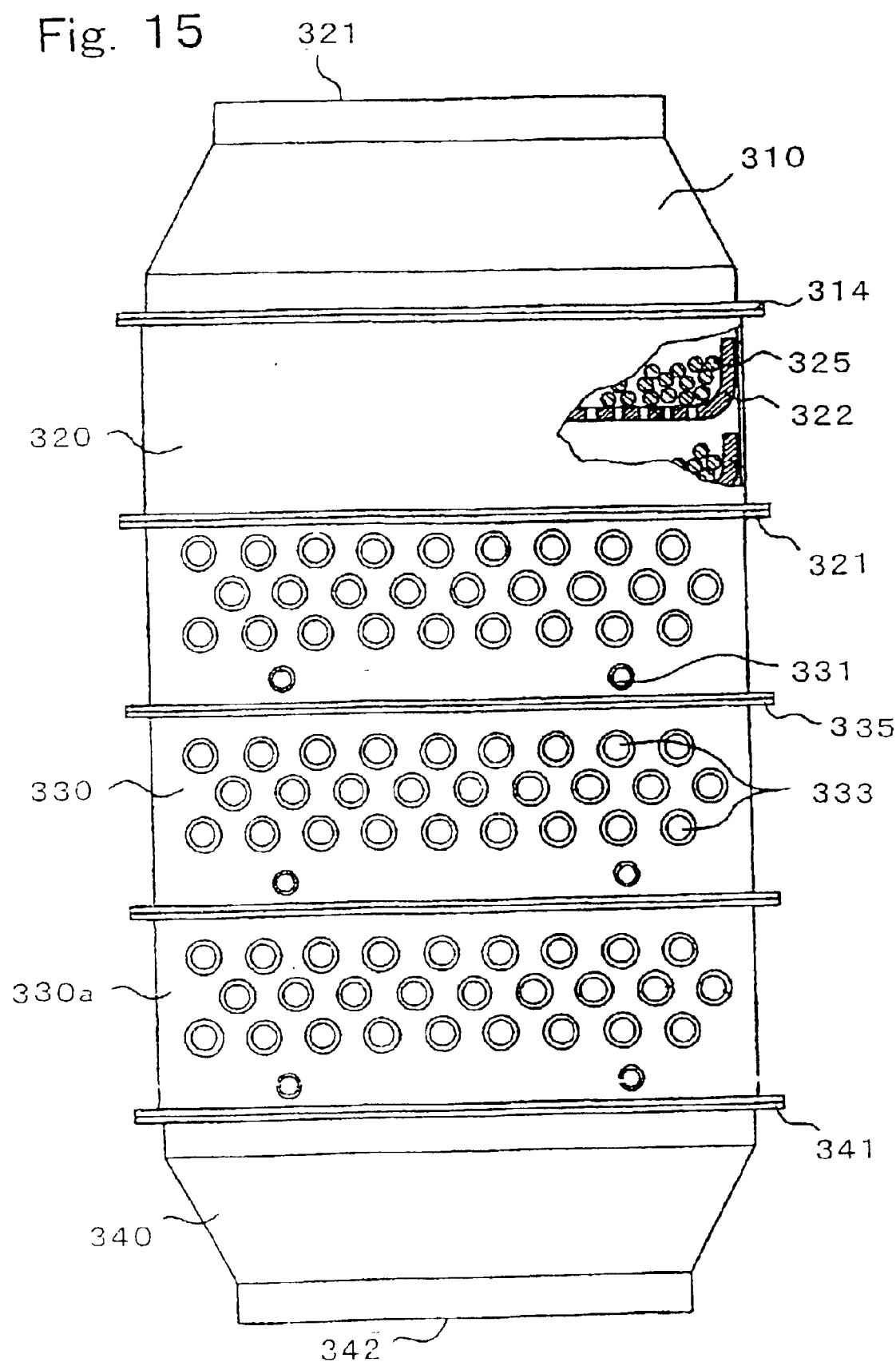
FIG. 15 shows a side view which diagrammatically depicts the emission cleaning installation from FIG. 13, with the filter container partially cut away and only some of the filtration materials illustrated.

Referring to FIGS. 13–15, this cleaning installation 300 continuously adjoins the emission supply duct 3, with the connecting component 310 in between, and is provided with a filtration container 320, the interior of which is filled with filtration materials 325, with a photocatalyst container 330, which continuously adjoins the corresponding filtration container in a freely removable and airtight manner, via or without a heat-resistant component 321, and the interior of which is filled with the photocatalyst pellets (not shown), and with a component 340 for expelling emissions, which continuously adjoins the corresponding photocatalyst container 330 in an airtight manner via or without a heat-resistant sealing material 341, and covers the photocatalyst container single body 330 in three layers.

Connecting component 310 consists of stainless steel and is provided with an air intake opening 312, which is of the same shape and size as the cross section of the emission supply duct 3, and with a lower opening (not shown), which is designed in the same shape and size as the cross section of the filter container 320, and the heat-resistant sealing material 314 is provided between the emission supply duct 3 and the filter container 320.

The filter container 320 consists of heat-resistant stainless steel, and its outer form is in the shape of a box, and has integral shelf materials 322 filled with filtration materials 325 of mesh-like design. The filtration materials 325 are either ceramic balls or silica gel balls with alkali-treated diameters of 5–25 mm; if appropriate, the photocatalyst pellets may be admixed. Moreover, the alkali-treated filtration materials 325 have the effect of neutralizing hydrogen chloride.

Figure 16:
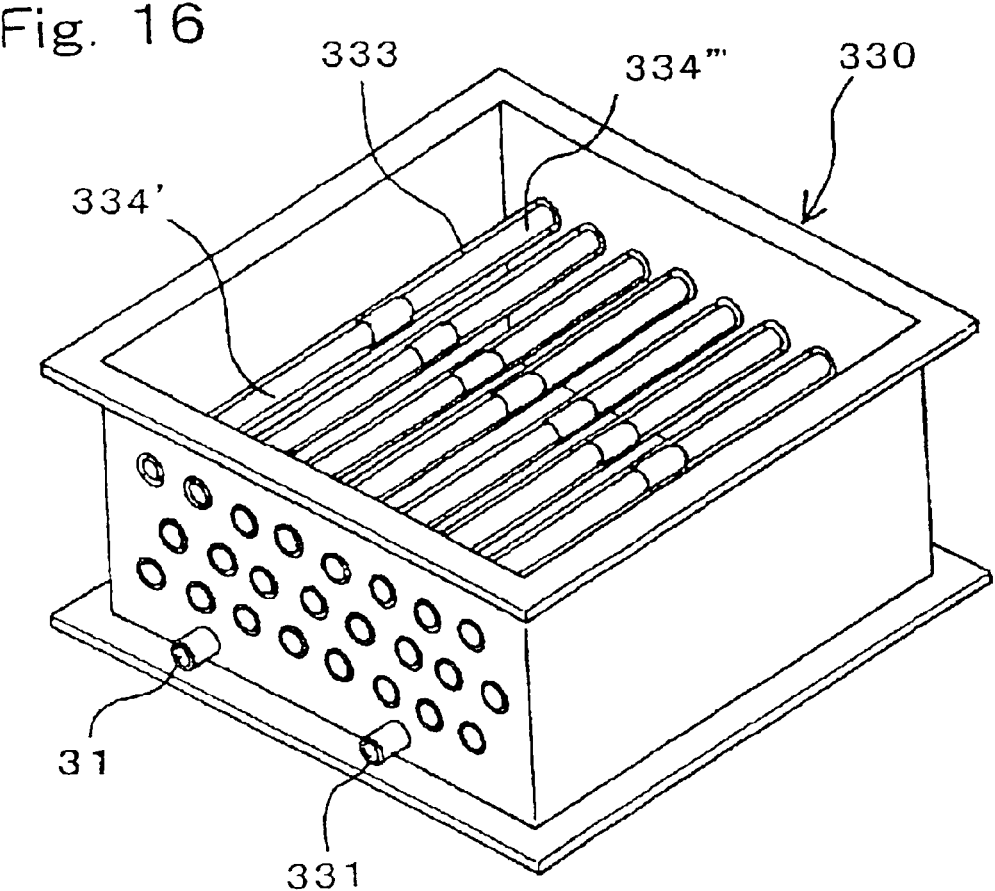
FIG. 16 represents a perspective view of the photocatalyst container single body from FIG. 13.
Figure 17:
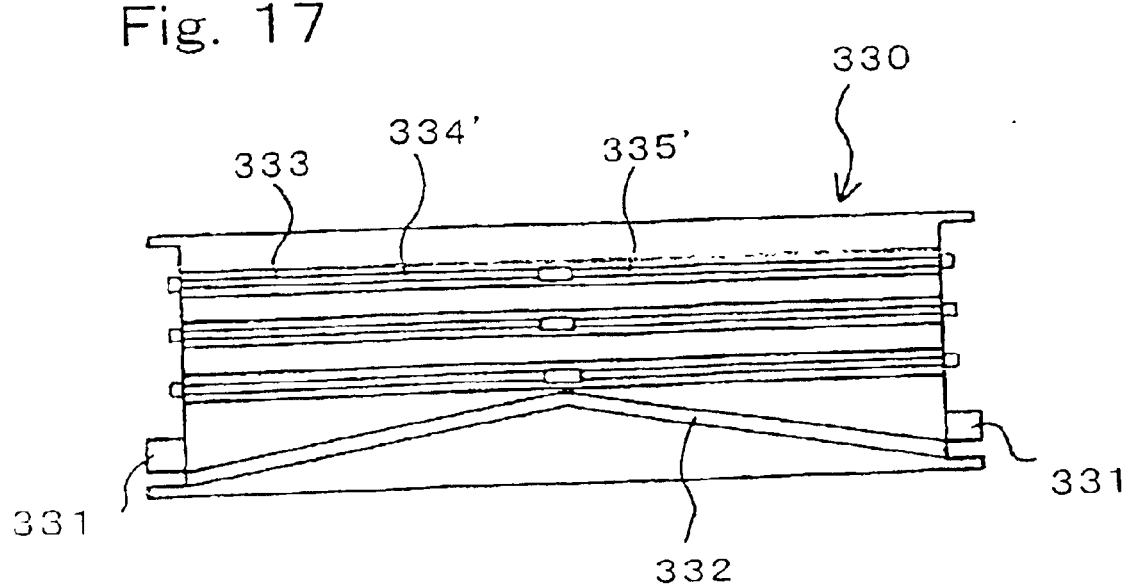
FIG. 17 shows a vertical section through the photocatalyst container single body from FIG. 13. The photocatalyst pellets are not shown.
Figure 18:
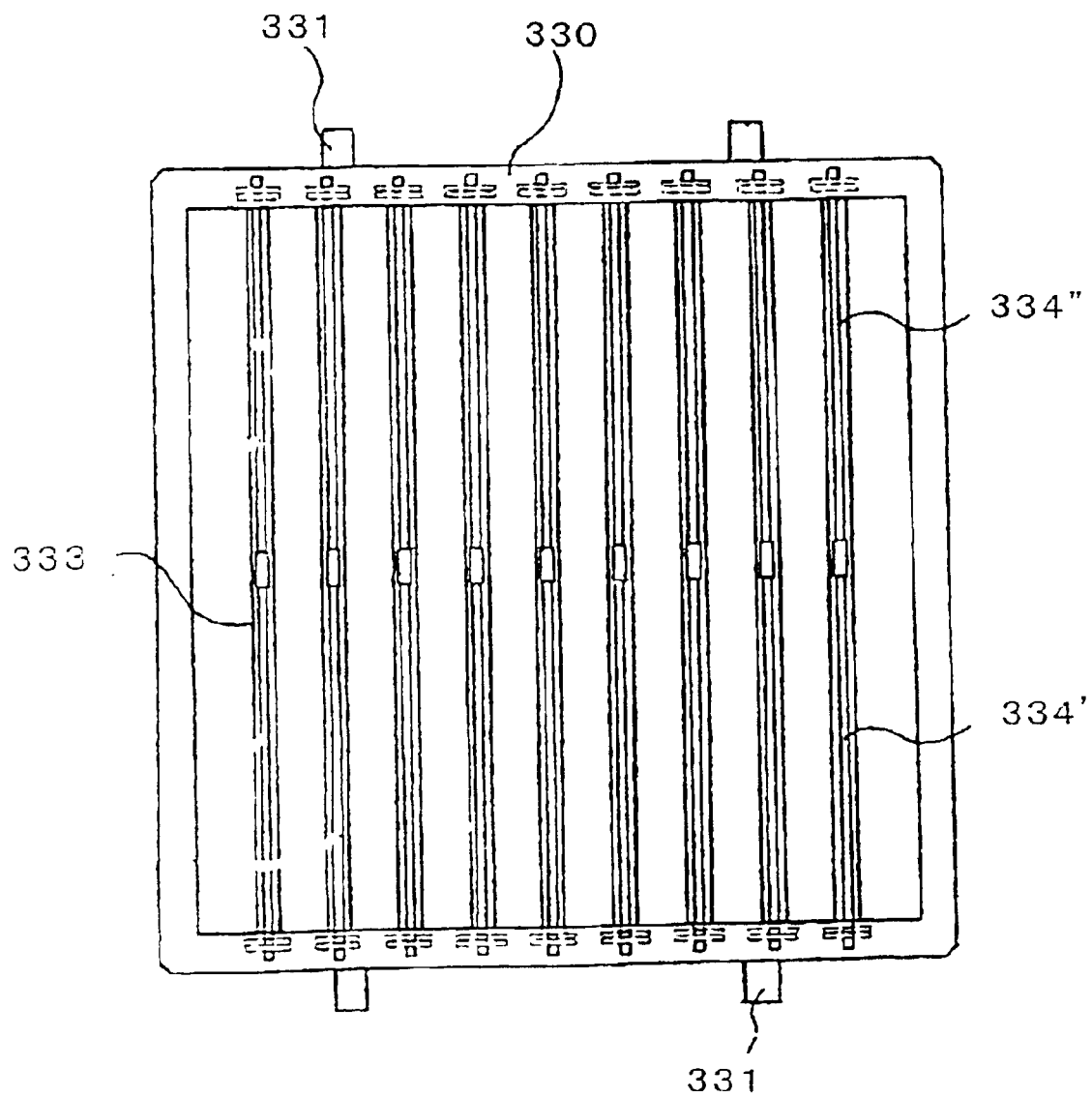
FIG. 18 shows a plan view of the photocatalyst container single body from FIG. 13. The photocatalyst pellets are not shown.

Furthermore, the photocatalyst container 330 also consists of the heat-resistant stainless steel, and its shape and size comprise dimensions of 1500×1500×500 mm, while its interior is filled with 1100 liters of photocatalyst pellets 305 with the photocatalyst (titanium oxide coating) applied to the surface of the transparent silica gel. As shown in FIGS. 16–18, a photocatalyst removal hole 331 for removing the photocatalyst when changing photocatalyst pellets is formed between the base surface and side wall, in the vicinity of the connecting section. The base surface 322 is designed in the form of a gable or hipped roof, in such a way that it is inclined from the central section, and adjoins the side wall above the photocatalyst removal hole 331. Moreover, a plurality of housings 333 are provided almost at regular intervals, in such a way that they pass through its interior, and from both sides disinfecting lamp 334' and black light lamp 334" are arranged in the longitudinal direction and in the transverse direction in an alternating positional relationship.

The housing 333 consists, in the form of a hollow cylinder, of quartz glass, but may also be of any desired design, provided that it is transparent and is permeable to ultraviolet light and is formed using heat-resistant materials; therefore apart from quartz glass, it may also consist, for example, of fused quartz glass, vitreous silica, light-transmitting alumina and the like.

Since the base surface 332 is designed in the form in which it is inclined from the central section, the photocatalyst pellets (not shown) can easily be recovered via the photocatalyst removal hole 331 and reprocessed when the photocatalyst removal hole 331 is open. The photocatalyst container 330 is separated from the filter container 320 and the reprocessed photocatalyst pellets are added, then the two are assembled. By repeating the above steps, it is possible for the laborious operation of changing the photocatalyst pellets to be carried out more easily and therefore the photocatalyst pellets can be reprocessed and recovered a large number of times.

Referring back to FIGS. 13–15, the component 340 for expelling emissions is a component which continuously adjoins the lower end of the photocatalyst container 330 which is furthest away from the emission supply duct 3, in an airtight manner via or without a heat-resistant sealing material 341, and its entire shape is practically identical to the abovementioned connecting component 310, except that it has an outlet opening 342 for the emissions to be treated.

The cleaning installation 300 is continuously adjoined, in an airtight manner, by three containers of the photocatalyst container single body 330 in series via the heat-resistant seal 335, but the number of connections, the cross-sectional shape of the photocatalyst container 330, the overall shape and size and the like can be designed as desired on the basis of the treatment capacity and the like of each incineration furnace.

Furthermore, the cleaning installation 300, which has a photocatalyst container connecting three of the abovementioned photocatalyst container single bodies, adjoins the stack of the incineration furnace which is fitted in an industrial waste disposal plant, and the concentration of dioxins in emissions taken in each case from the emission supply duct (inlet) and outlet opening (outlet), and also the concentration of coplanar PCBs, which was once again determined under a "Special Regulation" as the subject of the regulation, were measured every fourteen days for a period of one month. The measurement of the concentration of dioxins was carried out on the basis of the Ministry for Health and Welfare "Manual for the Standard Measurement of Dioxins in Waste Disposal" (February 1997).

Moreover, the photocatalyst container single body 330, as described above, is designed in the shape and size comprising dimensions of 1500×1500×500 mm, and its interior is filled with 1100 liters of photocatalyst particles with the photocatalyst pellets (titanium oxide coating) applied to the surface of the transparent silica gel. The measurement results obtained are compiled in Table 2:

TABLE 2

Results of tests aimed at reducing the levels of dioxins in emissions from refuse incineration furnaces

| Test No. | Measurement date | Temperature condition at the inlet to the catalyst (° C.) | PCDDs/Fs (ngTEQ/M$^3$ (s.t.p.)) | | Co-PCBs (ngTEQ/M$^3$ (s.t.p.)) | | Elimination level (%) | |
|---|---|---|---|---|---|---|---|---|
| | | | Inlet | Outlet | Inlet | Outlet | PCDDs/Fs | Co-PCBs |
| 1 | Feb. 17, 2000 | 210 | 53 | 0.16 | 1.1 | 0.000036 | 99.7 | 100 |
| 2 | Feb. 24, 2000 | 190 | 45 | 0.053 | 1.4 | 0.000032 | 99.9 | 100 |
| 3 | Mar. 2, 2000 | 335 | 81 | 0.45 | 2.1 | 0.014 | 99.4 | 99.3 |
| 4 | Mar. 11, 2000 | 271 | 130 | 1.6 | 3.7 | 0.052 | 98.8 | 98.6 |
| 5 | Mar. 17, 2000 | 202 | 49 | 1.2 | 1.1 | 0.025 | 97.6 | 97.7 |

PCCDS/Fs: Polychlorinated dibenzo-para-dioxins / polychlorinated dibenzofurans
Co-PCBs: Coplanar PCBs In Tests 1–5, although the concentration of dioxins in the emissions expelled from the incineration furnace to be tested was in the range from 45 ng TEQ/m$^3$N–130 ng TEQ/m$^3$N, if they are treated by means of the emission cleaning installation according to the invention, it was found that the concentration fell considerably, to a range of from 0.06 ng TEQ/m$^3$N–1.6 ng TEQ/m$^3$N, and the proportion of dioxins eliminated was in the range from 97.6%–99.9%. On the other hand, although the concentration of coplanar PCBs contained in emissions expelled from the incineration furnace to be tested was in the range from 1.1 ng TEQ/m$^3$N–3.7 ng TEQ/m$^3$N, if they are treated by means of the emission cleaning installation of the present invention, it was found that the concentration fell considerably, to a range of from 0.000032 ng TEQ/m$^3$N–0.052 ng TEQ/m$^3$N, and the proportion of coplanar PCBs eliminated was in the range from 97.7%–100%.

Furthermore, the total quantities of dioxins or coplanar PCBs contained in removal solutions removed from the recovered photocatalyst bodies—although there are no concrete data for actual values and the like—based on the total quantities of dioxins or coplanar PCBs in the treated emissions are in each case in the range from approximately 1–3%. From this, it was possible to deduce and was found that the dioxins or coplanar PCBs eliminated in each test have not adhered to the photocatalyst pellets, but rather were, as it were, broken down by oxidation by the catalytic action of the photocatalyst pellets.

From the above results, it was established that the considerable elimination capacity can be achieved even in the region of the emission temperature of 300° C., at which the formation of dioxins was previously considered to be at its maximum, and that even coplanar PCBs, which were previously difficult to eliminate using oxidative photocatalysts, can be effectively reduced in the same way as polychlorinated dibenzofurans (PCDFs) and polychlorinated dibenzo-para-dioxins (PCDDs).

As described above, the designs of the emission cleaning installation of the present invention have been explained here on the basis of preferred exemplary embodiments, but these should only be considered to be representative examples, and therefore the present invention may, of course, be designed and varied as desired, provided that it does not go beyond the core of the patent claims.

What is claimed is:

1. An emission cleaning installation in fluid communication with a supply duct of an incineration furnace comprising:

a plurality of spaces, wherein the spaces are in fluid communication with each other and positioned within the installation;

a housing having an ultraviolet permeable body provided to each space;

a photocatalyst body which is accommodated in the abovementioned space and with which the emissions expelled from said incineration furnace come into contact; and a light source which is fitted into said housing, said light source adapted to emit light waves capable of exciting said photocatalyst body.

2. The emission cleaning installation according to claim 1, wherein said housing has a cross section that is selected from the group consisting of elliptical or circular.

3. The emission cleaning installation according to claim 2, wherein said light source further comprises a combination of a disinfecting lamp and a black light lamp.

4. The emission cleaning installation according to claim 3, wherein said space has an inner wall surface that is polished to a mirror finish.

5. The emission cleaning installation according to claim 4 further comprising
an open end of said body, which is in fluid communication with the exterior of said housing, and wherein said light source is designed to be air-coolable.

6. The emission cleaning installation according to claim 5, wherein the connecting section between said emission supply duct and said emission cleaning installation defines a pipe hole for supplying air to the installation.

7. The emission cleaning installation according to claim 6, wherein said emissions are fed to said emission cleaning installation without temperature control.

8. The emission cleaning installation according to claim 1, wherein said light source comprises a combination of a disinfecting lamp and a black light lamp.

9. The emission cleaning installation according to claim 1, wherein said space has an inner wall surface that is polished to a mirror finish.

10. The emission cleaning installation according to claim 1 further comprising
an open end of said body, which is in fluid communication with the exterior of said housing, and wherein said light source is designed to be air-coolable.

11. The emission cleaning installation according to claim 1, wherein the connecting section between said emission supply duct and said emission cleaning installation defines a pipe hole for supplying air to the installation.

12. The emission cleaning installation according to claim 1, wherein said emissions are fed to said emission cleaning installation without temperature control.

13. The emission cleaning installation according to claim 1, wherein said photocatalyst body is comprised of a plurality of photocatalyst pellets that comprise a porous body having a porous support in which the surface of the porous support is coated with a titanium oxide coating and wherein the porous support is selected from the group consisting of metal or ceramic.

14. The emission cleaning installation according to claim 1, wherein said photocatalyst body is comprised of a plurality of photocatalyst pellets having a fibrous structure which contains heat-resistant fibers having a surface coated with a titanium oxide costing, wherein the fibrous structure is selected from the group consisting of a nonwoven fiber, a knitted fabric and a woven fabric.

15. The emission cleaning installation according to claim 1, wherein said photocatalyst body is coated with a crystalline form of titanium oxide in an anatase form.

* * * * *